(12) United States Patent
Brook et al.

(10) Patent No.: US 9,382,014 B2
(45) Date of Patent: Jul. 5, 2016

(54) FLUID DYNAMIC VENT DAM

(71) Applicant: The Boeing Company, Chicago, IL (US)

(72) Inventors: Kenneth L. Brook, Seattle, WA (US); Bonnie A. Keefe, Everett, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/634,818

(22) Filed: Feb. 28, 2015

(65) Prior Publication Data

US 2015/0239570 A1 Aug. 27, 2015

Related U.S. Application Data

(62) Division of application No. 12/652,020, filed on Jan. 4, 2010, now Pat. No. 9,010,689.

(51) Int. Cl.
| | | |
|---|---|---|
| *B64D 37/00* | (2006.01) | |
| *B64D 37/32* | (2006.01) | |
| *B64C 3/18* | (2006.01) | |
| *B64C 3/34* | (2006.01) | |
| *B64D 37/06* | (2006.01) | |
| *B64D 37/10* | (2006.01) | |

(52) U.S. Cl.
CPC .............. *B64D 37/005* (2013.01); *B64C 3/182* (2013.01); *B64C 3/34* (2013.01); *B64D 37/06* (2013.01); *B64D 37/10* (2013.01); *B64D 37/32* (2013.01); *Y10T 29/49622* (2015.01)

(58) Field of Classification Search
CPC ........ B64C 3/34; B64C 3/182; B64D 37/005; B64D 37/10; B64D 37/06; B64D 37/32; Y10T 29/49622

See application file for complete search history.

(56) References Cited

U.S. PATENT DOCUMENTS

| | | |
|---|---|---|
| 3,117,751 A | 1/1964 | Rogers et al. |
| 3,291,026 A | 12/1966 | Simpson |
| 4,802,642 A | 2/1989 | Mangiarotty |
| 5,368,258 A | 11/1994 | Johnson et al. |
| 6,050,523 A | 4/2000 | Kraenzien |
| 2008/0128553 A1 | 6/2008 | Brown et al. |
| 2008/0128554 A1 | 6/2008 | Pham et al. |
| 2008/0290214 A1 | 11/2008 | Guzman et al. |
| 2008/0302912 A1 | 12/2008 | Yip et al. |
| 2008/0302915 A1 | 12/2008 | Yip et al. |

OTHER PUBLICATIONS

USPTO Non-Final Office Action (15 pages), mailed Jul. 18, 2013, in parent case, U.S. Appl. No. 12/652,020, filed Jan. 4, 2010.
USPTO Final Office Action (10 pages), mailed Apr. 24, 2014, in parent case, U.S. Appl. No. 12/652,020, filed Jan. 4, 2010.

*Primary Examiner* — Valentina Xavier

(57) ABSTRACT

The disclosure provides in one embodiment for a vent dam for use in a vent stringer in a fuel vent system. The vent dam is configured to mount to and within the vent stringer The vent dam has a contoured guiding surface for guiding fuel flow into and out of an interior of the vent stringer, wherein the vent dam, the vent stringer, and a tube attached to the vent stringer are in fluid communication with one or more fuel tanks. The vent dam further has one or more side flanges extending from the contoured guiding surface for providing attachment of the vent dam to one or more interior portions of the vent stringer, wherein the contoured guiding surface and the one or more side flanges are formed as one piece.

21 Claims, 25 Drawing Sheets

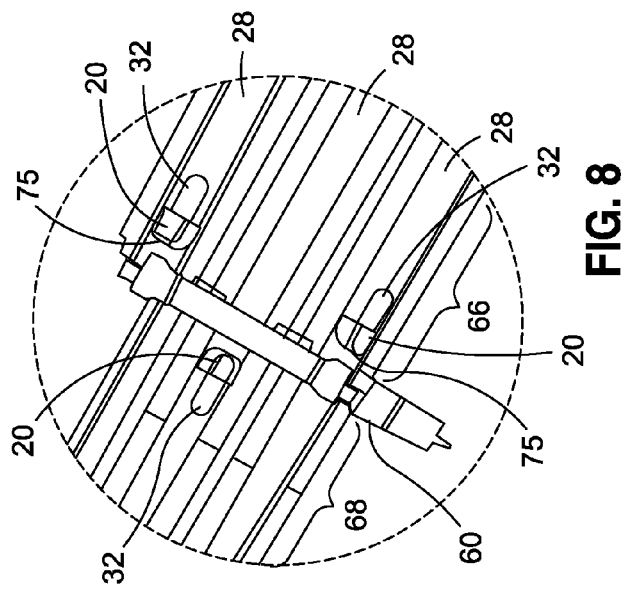
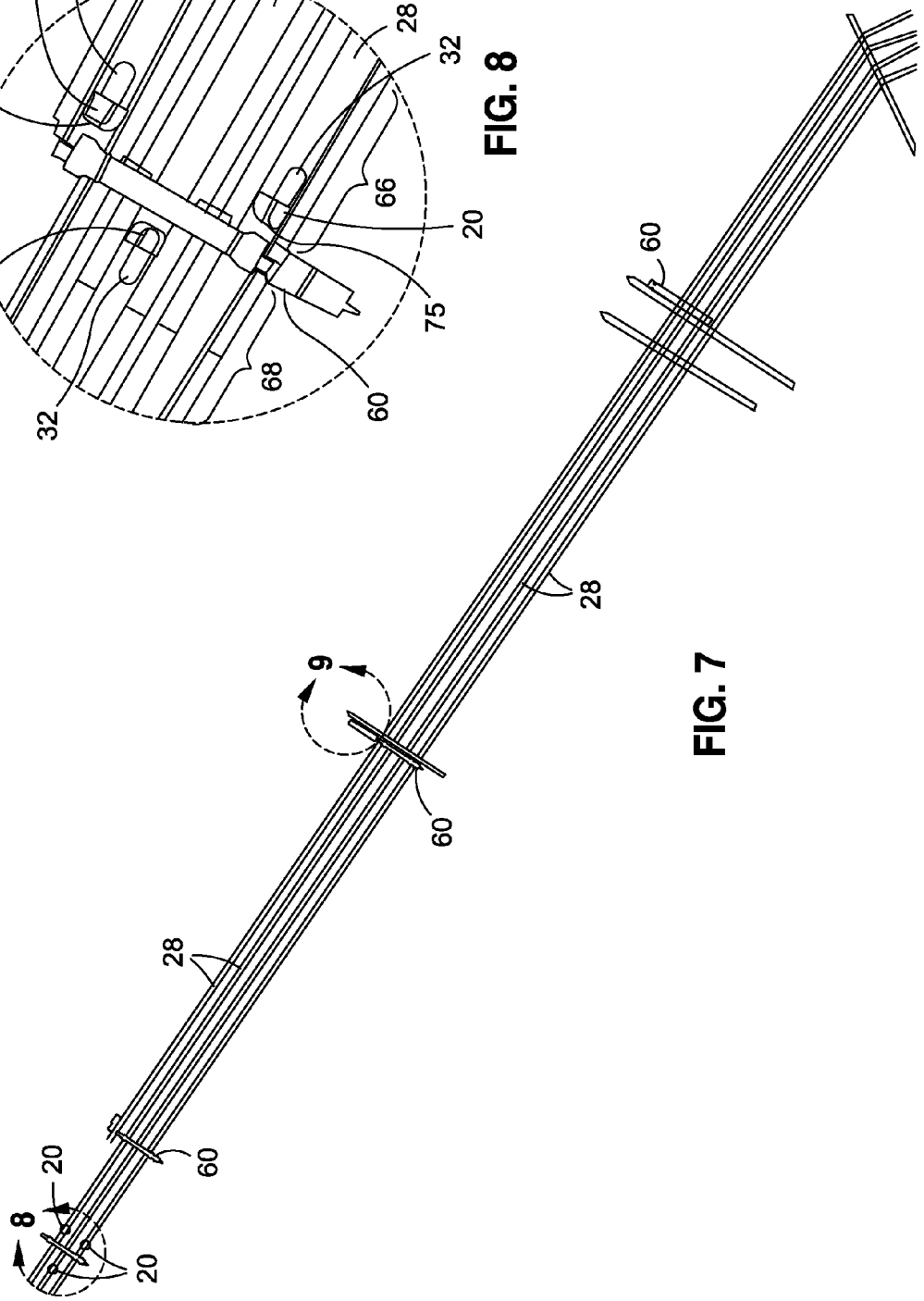

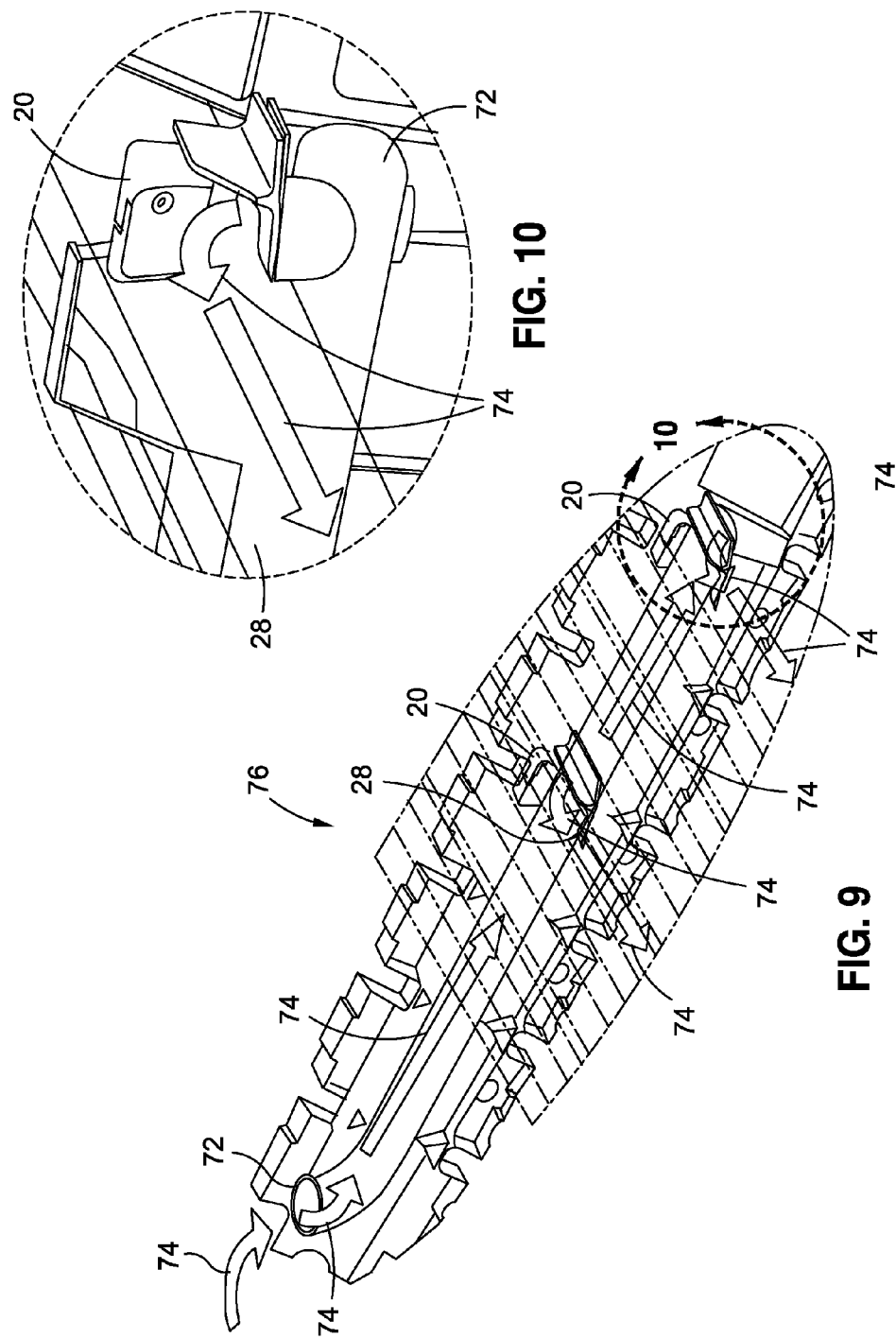

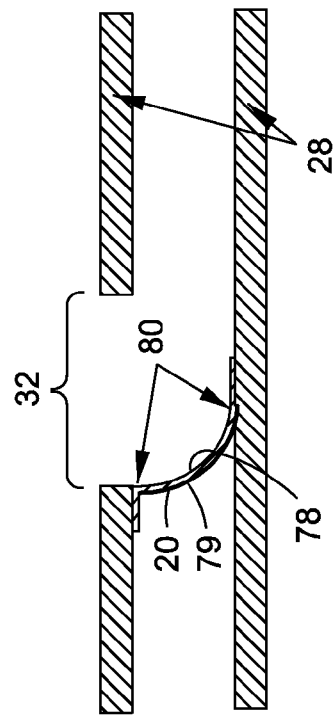
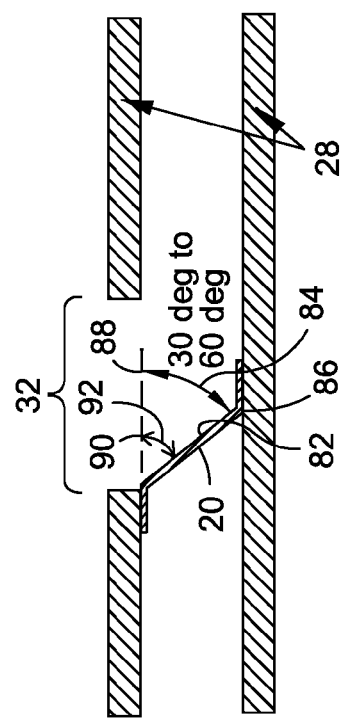
FIG. 12
FIG. 11

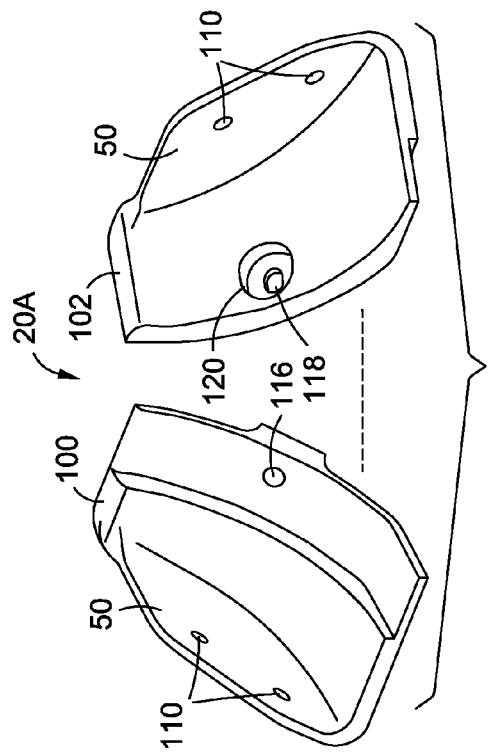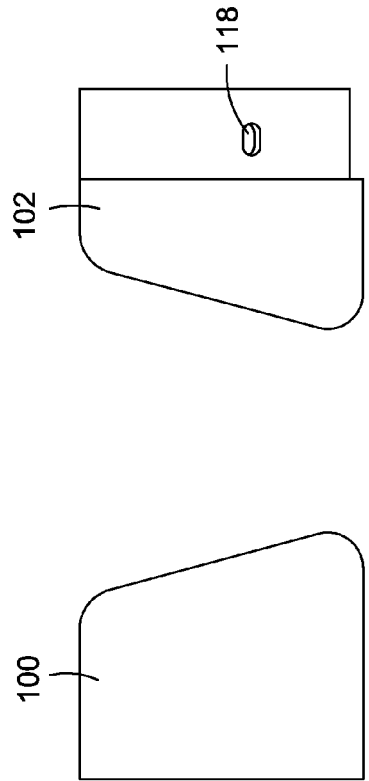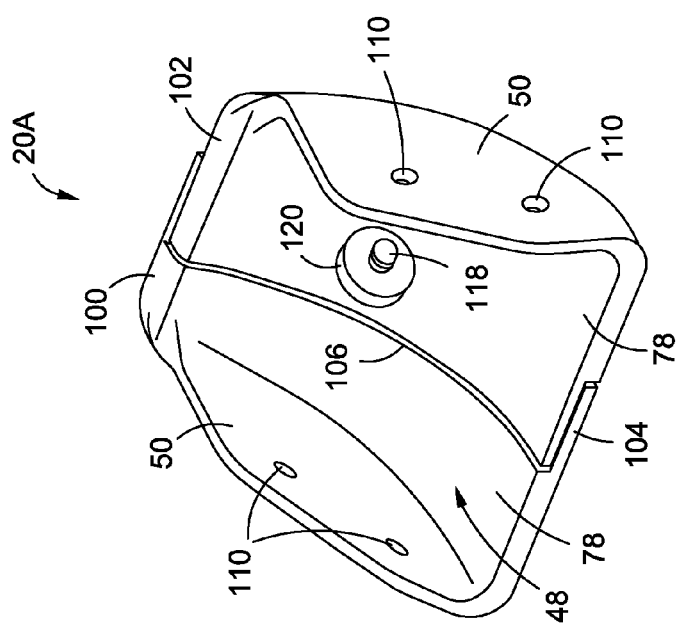

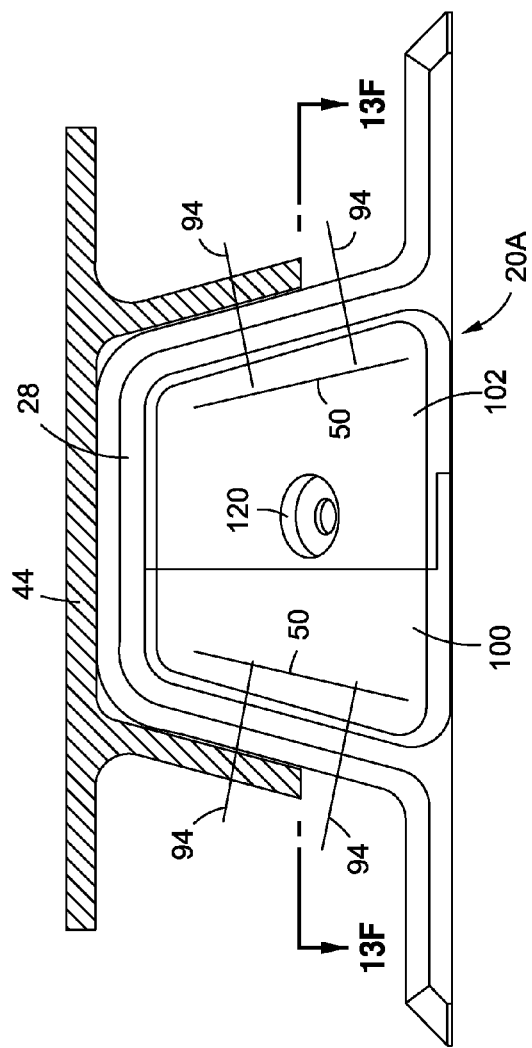
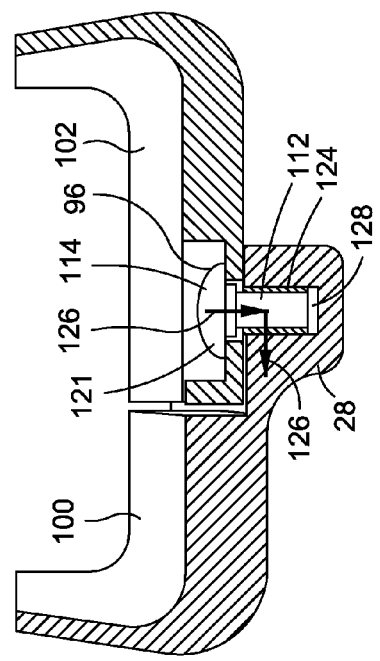
FIG. 13E
FIG. 13F

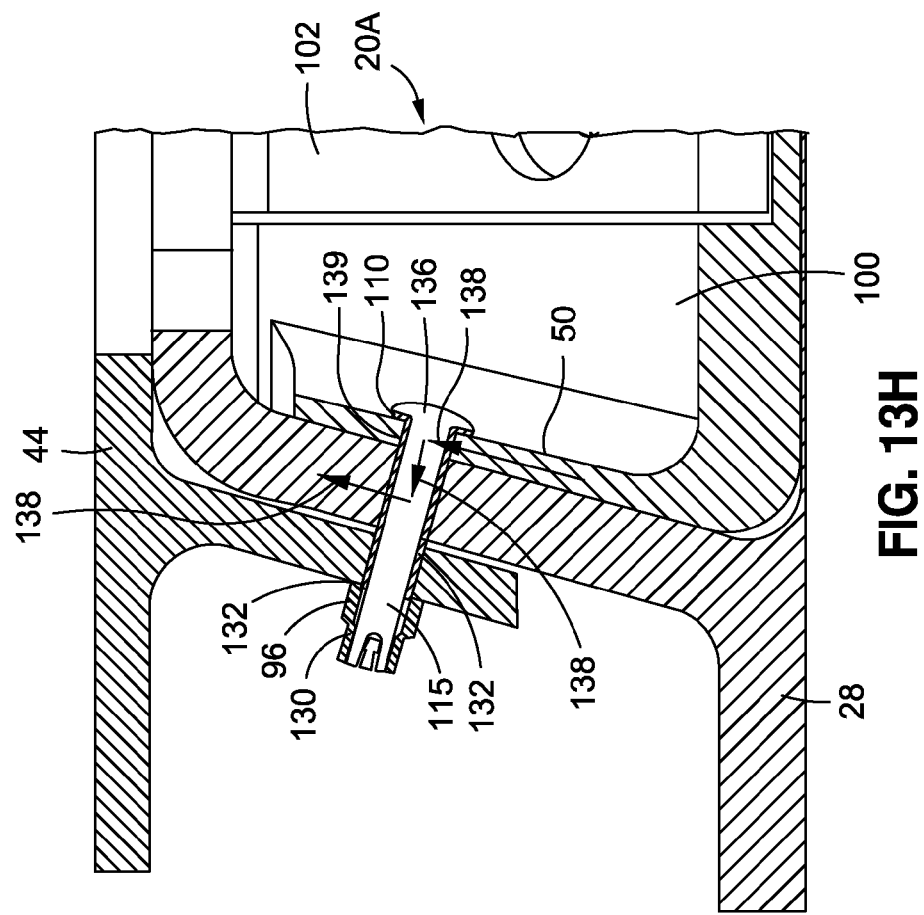
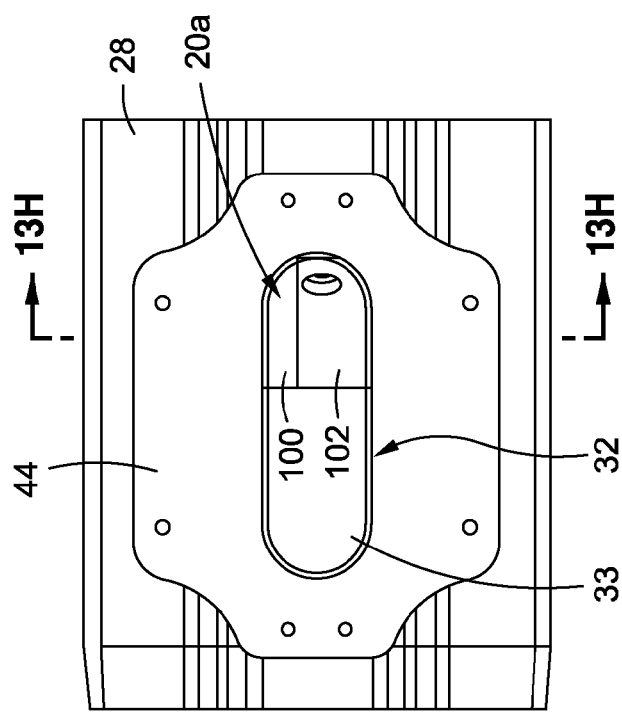
FIG. 13H
FIG. 13G

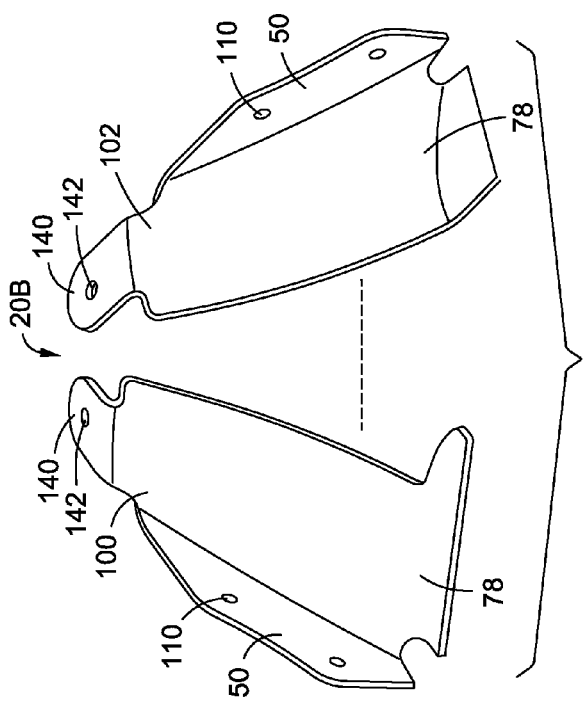
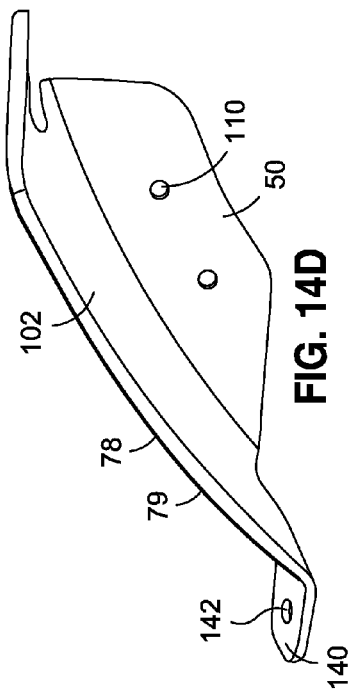
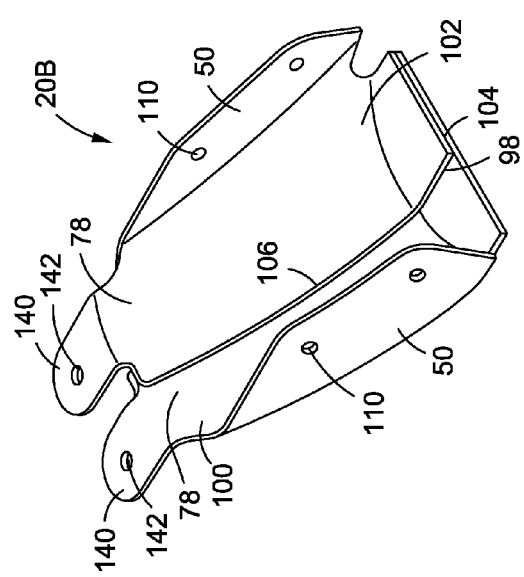
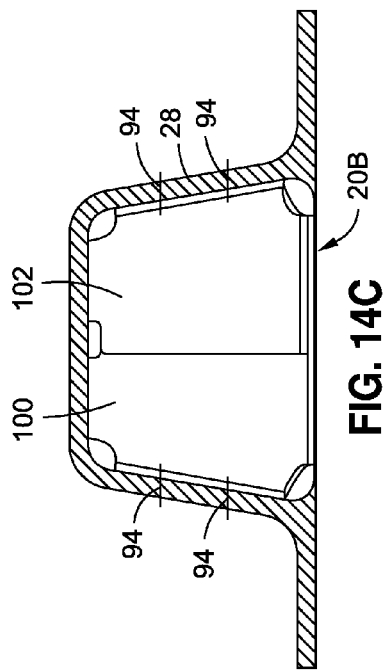
FIG. 14A
FIG. 14B
FIG. 14C
FIG. 14D

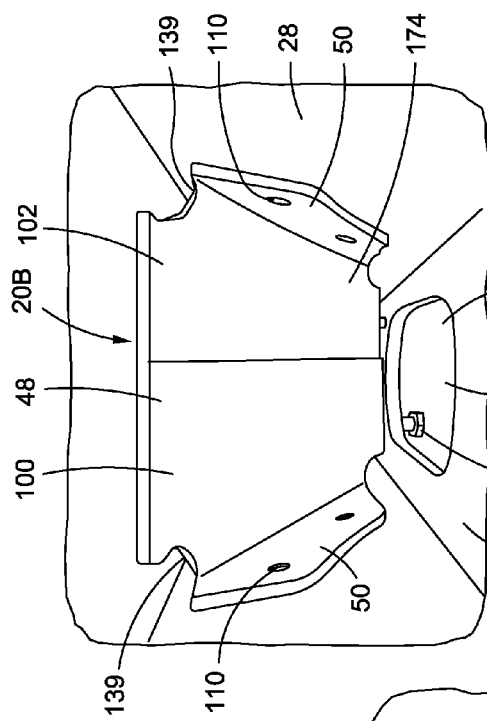
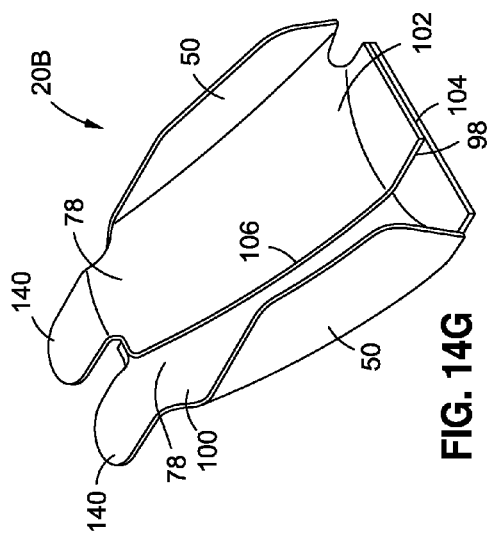
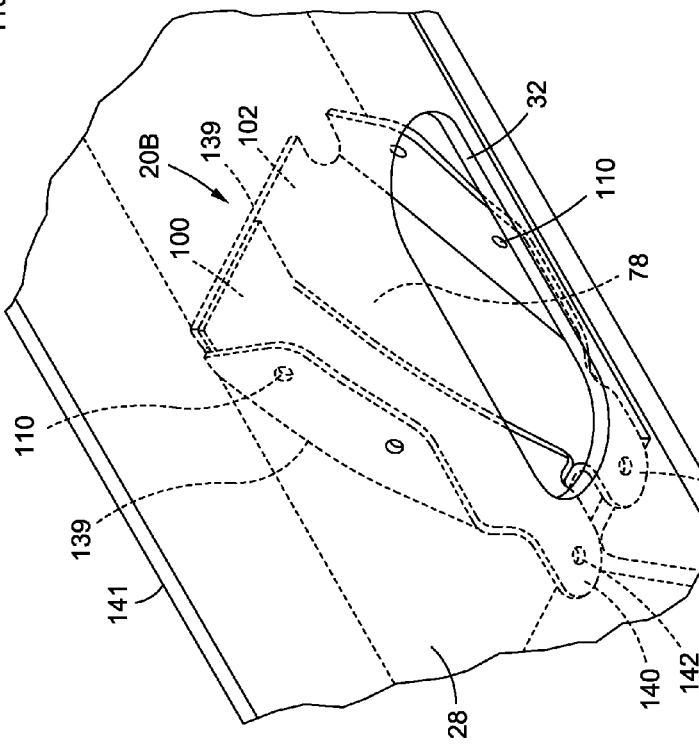
FIG. 14E
FIG. 14G
FIG. 14F

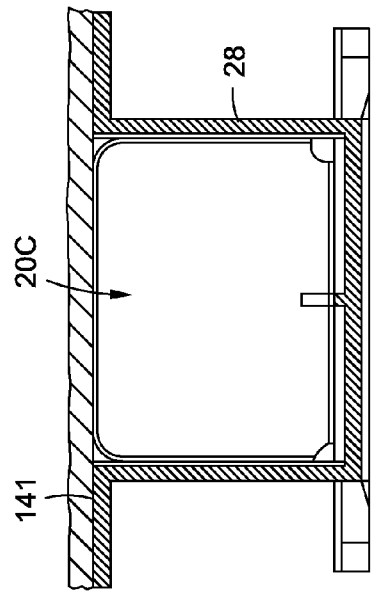
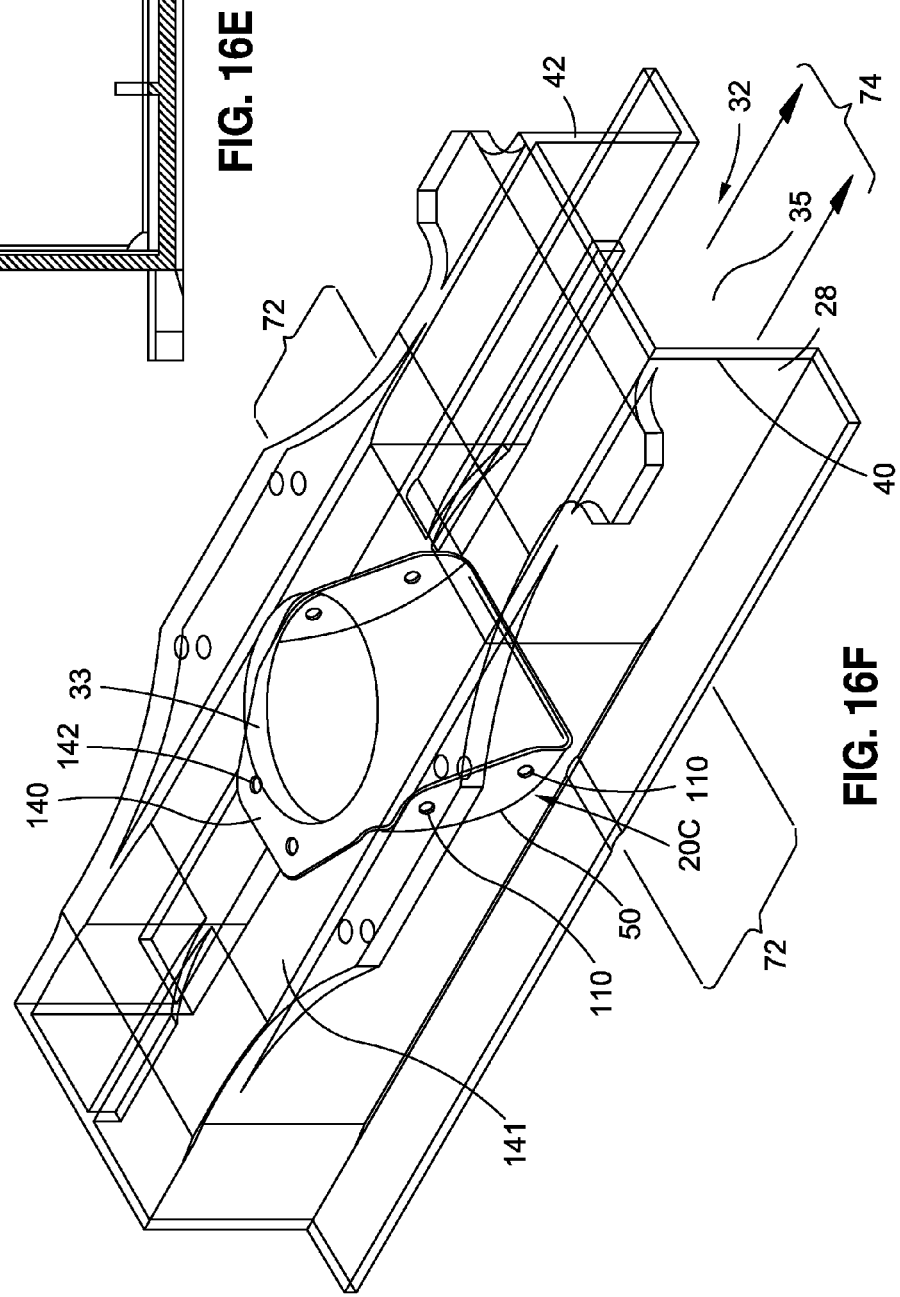

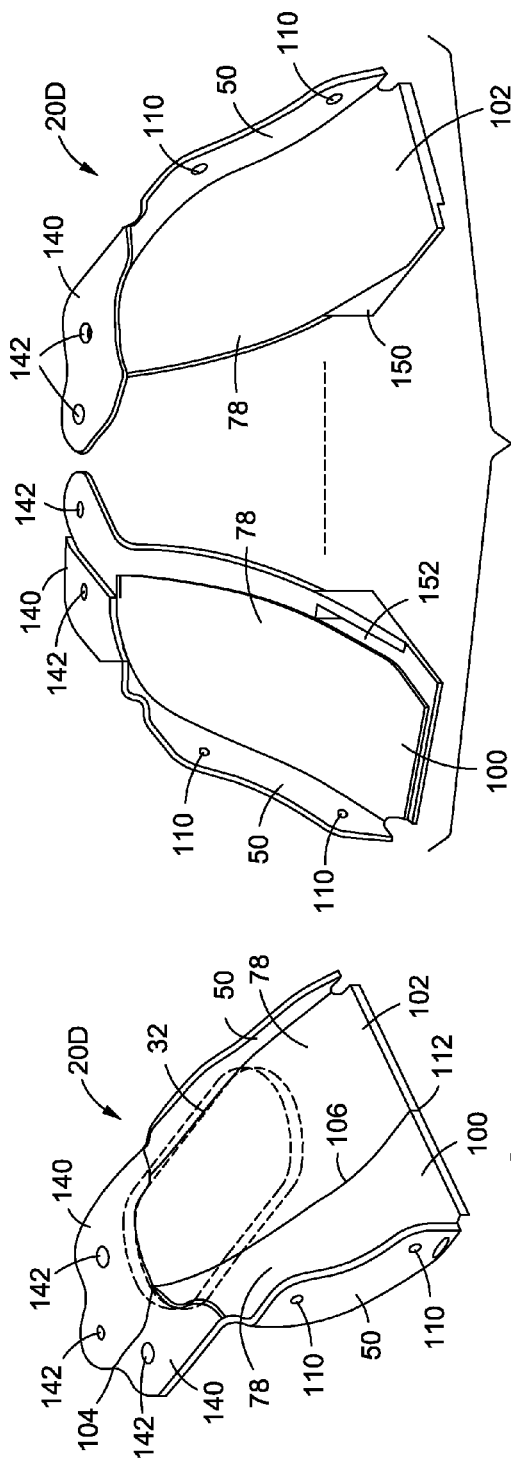
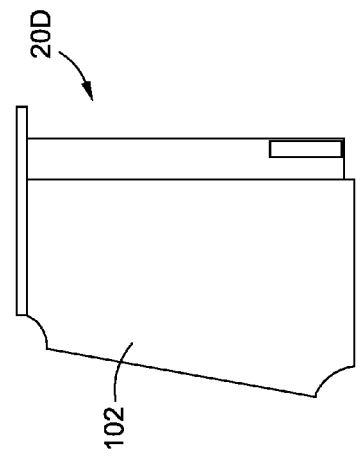
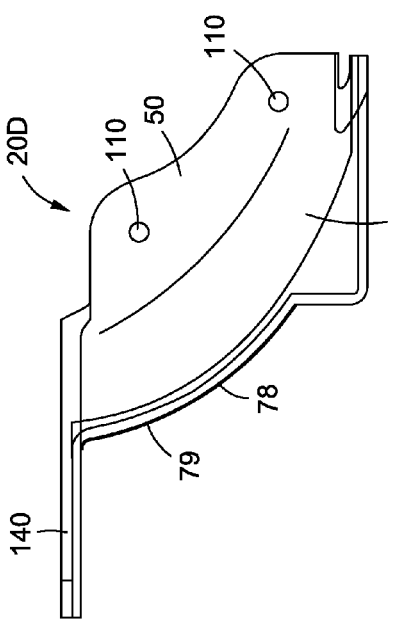
FIG. 18B
FIG. 18D
FIG. 18A
FIG. 18C

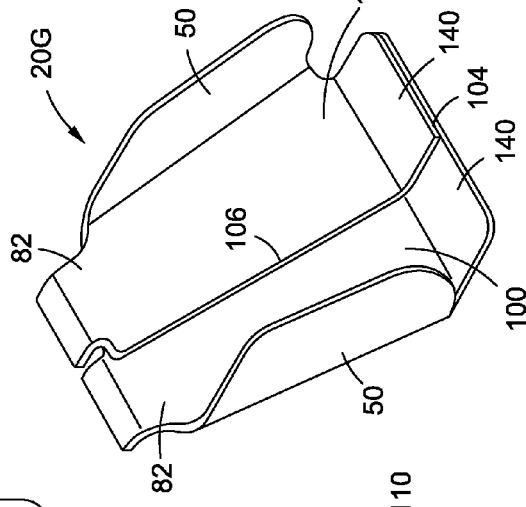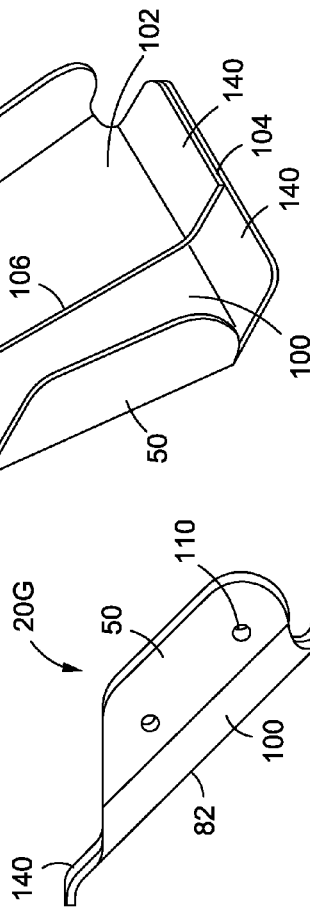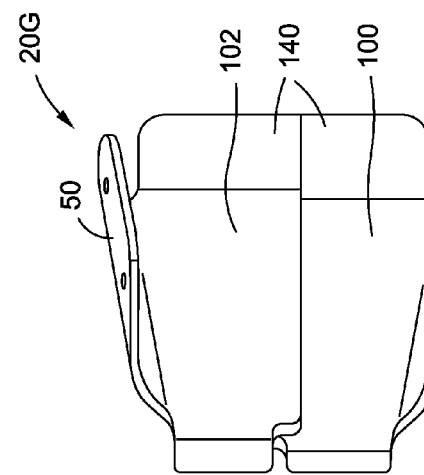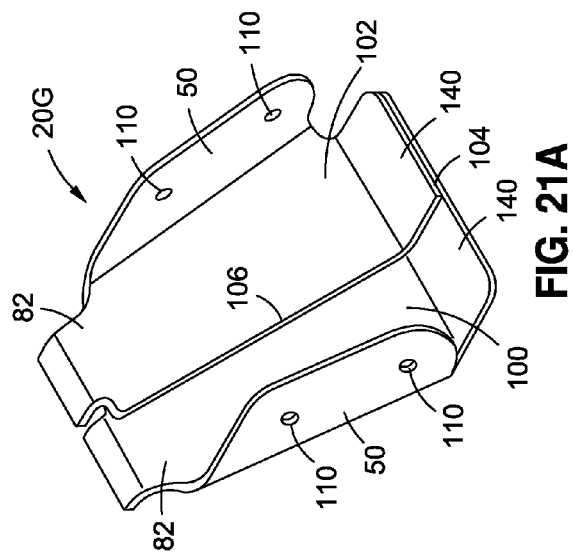

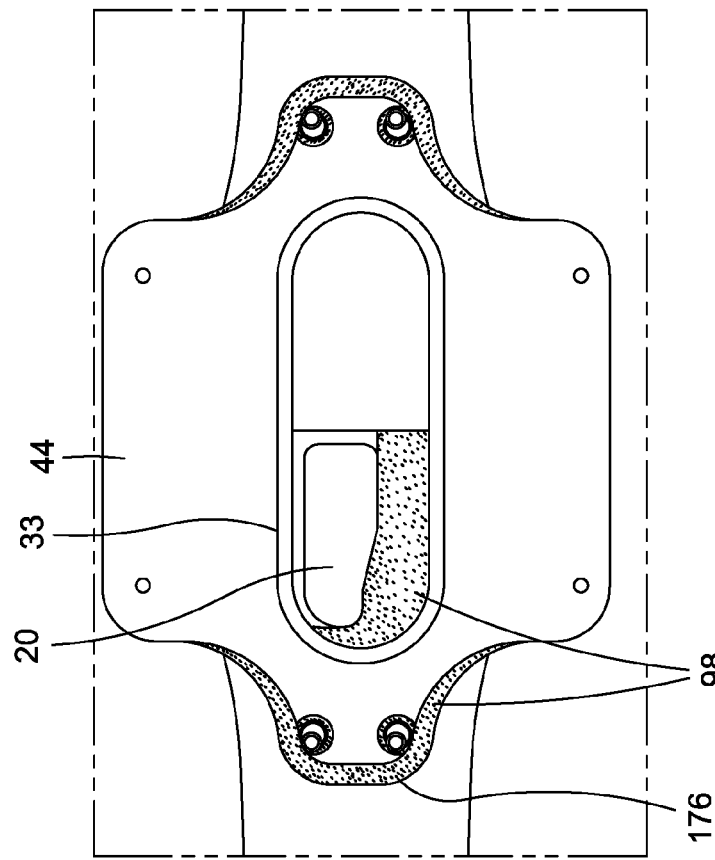
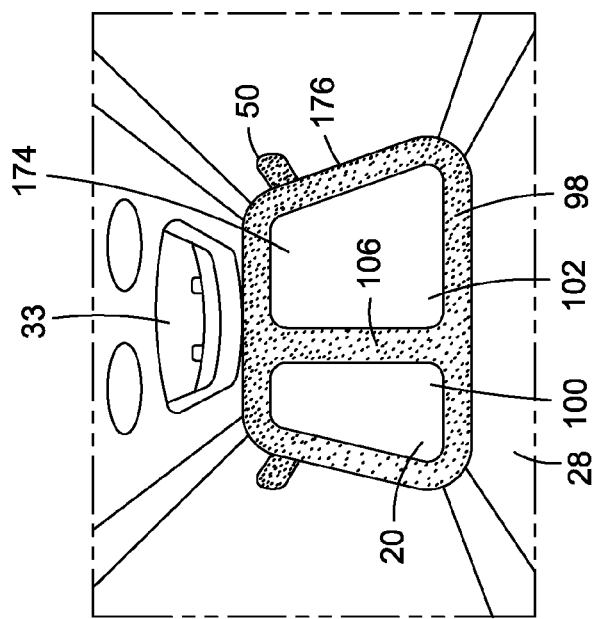

FLUID DYNAMIC VENT DAM

CROSS-REFERENCE TO RELATED APPLICATIONS

The present application is a divisional of and claims priority to pending application Ser. No. 12/652,020, filed Jan. 4, 2010, entitled "Fluid Dynamic Vent Dam", the entire contents of which is incorporated herein by reference, and which is related to U.S. application Ser. No. 12/638,976, entitled "High PullOff Capability Hat Stringer", filed on Dec. 15, 2009, and abandoned on Sep. 17, 2010, the entirety of which is incorporated by reference herein, and which is also related to U.S. application Ser. No. 12/474,005, entitled "Stringer Transition Method", filed on May 28, 2009, and issued as U.S. Pat. No. 8,074,694 on Dec. 13, 2011, the entirety of which is incorporated by reference herein, and which is also related to U.S. application Ser. No. 12/332,093, entitled "Method for Producing Composite Laminates Using a Collapsible Mandrel", filed on Dec. 10, 2008, and issued as U.S. Pat. No. 8,293,051 on Oct. 23, 2012, the entirety of which is incorporated

BACKGROUND

1) Field of the Disclosure

The disclosure relates generally to fuel vent systems in aircraft and other craft, and more particularly, to a vent dam configuration and method for use in a structural fuel vent stringer system in an aircraft.

2) Description of Related Art

Composite structures are used in a wide variety of applications. In aircraft construction, composites are used in increasing quantities to form the fuselage, wings, tail section, and other components. For example, the wings may be constructed of composite skin members to which stiffening elements, such as stringers, may be coupled to increase the bending strength and stiffness of the skin member. The stringers may extend in a generally span wise direction along the wing. The stringers may be bonded to the skin members and may be configured to carry bending loads or loads that are oriented substantially perpendicularly relative to the skin member.

Stringers may be provided in a wide variety of cross-sectional shapes. For example, a stringer cross-section may comprise a plurality of composite plies formed in a hat section configuration having a base portion and a pair of webs extending outwardly from the base portion. The base portion may comprise a pair of flanges to facilitate coupling (e.g., bonding) of the stringer to the skin member, such as the upper and lower wing skins of a wing. The hat section stringer may include a cap which interconnects the webs and encloses the hat section in order to increase the torsional rigidity of the stringer.

The stringers in a wing may extend from an inboard section of the wing to an outboard section of the wing. The stringers may include purely structural non-vent stringers and stringers that serve both as structural and system elements, such as vent stringers. Both types of stringers provide a primary load carrying function. The vent stringers may provide a secondary function by acting as a conduit for venting fuel and fuel vapors from the inboard sections of the wing fuel tanks to surge tanks. The vent stringers may include several vent dams that serve as fuel tank boundaries or barriers to ensure that the fuel and fuel vapor flow travels in the desired direction. Known vent dams exist. Such known vent dams may be made of sheet metal and have a flat plate surface attached at 90 degree angles to four side wall flanges. Because such known vent dams only act to block fuel flow, the fuel flow can impinge on an upper wing skin when entering the vent stringer and then must change direction by 90 degrees to flow down a vent stringer channel. Moreover, when the fuel flow enters the vent stringer, the fuel flow can impinge on the vent dam. Such fuel flow impingement on the upper wing skin and the vent dam, as well as an instantaneous 90 degree change of flow direction can result in turbulence and pressure drop or loss. Such pressure drop or loss can result in higher structural loads and a decreased refuel rate.

Accordingly, there is a need in the art for an improved vent dam configuration and method for use in a vent stringer system that provides advantages over known vent dam configurations and methods.

SUMMARY

This need for an improved vent dam configuration and method for use in a vent stringer system is satisfied. Unlike known vent dams, embodiments of the vent dam configuration and method may provide numerous advantages. The vent dam configuration and method provides an improved vent dam and method where the vent dam has a guiding surface that may be curved or sloped for efficiently and smoothly directing and improving fluid flow, such as fuel flow and vapor flow, in a vent stringer system. The vent dam configuration and method provides an improved vent dam and method that prevents or minimizes turbulence in a fluid flow, such as fuel flow and vapor flow, in a vent stringer, thus, reducing pressure drop or loss and resulting in an increased refuel rate. The vent dam configuration and method provides a vent dam and method where the vent dam is located relative to a vent stringer access opening and relative to a fluid flow, such as a fuel flow or vapor flow, so as to optimize the fluid flow into and out of the vent stringer. The vent dam configuration and method provides an improved vent dam and method where the vent dam may be comprised of one piece or multiple pieces to enable easy access of the vent dam through the vent stringer access opening, to eliminate the need for blind fasteners, and to allow for effective sealant application, thus resulting in efficient installation, fastening, and sealing of the vent dam within the vent stringer.

In an embodiment of the disclosure, there is provided a vent dam for use in a vent stringer in a fuel vent system. The vent dam is configured to mount to and within the vent stringer. The vent dam comprises a contoured guiding surface for guiding fuel flow into and out of an interior of the vent stringer, wherein the vent dam, the vent stringer, and a tube attached to the vent stringer are in fluid communication with one or more fuel tanks. The vent dam further has one or more side flanges extending from the contoured guiding surface for providing attachment of the vent dam to one or more interior portions of the vent stringer, wherein the contoured guiding surface and the one or more side flanges are formed as one piece.

In another embodiment of the disclosure there is provided an aircraft structure. The aircraft structure comprises at least one wing and at least one vent stringer mounted to the at least one wing. The at least one vent stringer comprises a base portion, first and second web walls extending outwardly from the base portion, a cap portion, and an access opening in the cap portion. The access opening is configured for insertion and installation of vent dams. The aircraft structure further comprises at least one fuel tank.

The vent dams are mounted to and within the at least one vent stringer. The vent dams each comprise a contoured guiding surface for guiding fuel flow into and out of an interior of the at least one vent stringer, wherein the vent dams, the at least one vent stringer, and a tube attached to the at least one vent stringer are in fluid communication with the at least one fuel tank. The vent dams each further comprise one or more side flanges extending from the contoured guiding surface for providing attachment of the vent dams to one or more interior portions of the at least one vent stringer, wherein at least one of the vent dams is formed as one piece.

In another embodiment of the disclosure there is provided a method for providing improved fluid flow in a vent stringer of a fuel vent system. The method comprises attaching one or more side flanges of a vent dam to one or more interior portions of the vent stringer in a fuel tank, the vent dam being adjacent to an opening in the vent stringer. The vent dam includes a contoured guiding surface and the one or more side flanges extending from the contoured guiding surface, and the contoured guiding surface and the one or more side flanges are formed as one piece.

The method may further comprise introducing a fluid flow through the opening in the vent stringer. The method may further comprise using the contoured guiding surface to guide the fluid flow into and out of the vent stringer, wherein the vent dam, the vent stringer, and a tube attached to the vent stringer are in fluid communication with the fuel tank. The method may further comprise using the contoured guiding surface to prevent turbulence in the fluid flow which results in a reduced pressure drop across the vent dam to improve fluid flow in the vent stringer of the fuel vent system.

The attaching the one or more side flanges of the vent dam may comprise attaching the vent dam with the contoured guiding surface being curved and having a bend radius. The attaching the one or more side flanges of the vent dam may comprise inserting one or more fastener elements through one or more flange holes defined through an end flange of the vent dam to fasten and secure the end flange of the vent dam to the vent stringer in the fuel tank. The attaching the one or more side flanges of the vent dam may comprise mechanically attaching the one or more side flanges to the vent stringer via one or more fastener elements. The attaching the one or more side flanges of the vent dam may comprise bonding the one or more side flanges to the vent stringer via a bonding agent.

In another embodiment of the disclosure there is provided a vent dam for use in a vent stringer in a fuel vent system. The vent dam comprises a contoured guiding surface for guiding fluid flow in a vent stringer. The vent dam further comprises one or more side flanges extending from the contoured guiding surface for providing attachment of the vent dam to the vent stringer.

In another embodiment of the disclosure, there is provided a fluid dynamic fuel vent dam for use in a vent stringer in a fuel tank. The vent dam comprises a first piece joined to a second piece with an overlapping configuration at a seam formed between the first piece and the second piece. The vent dam further comprises a curved guiding surface for guiding fuel flow in a vent stringer. The vent dam further comprises one or more side flanges extending from the curved guiding surface for providing attachment of the vent dam to one or more interior portions of the vent stringer.

In another embodiment of the disclosure, there is provided an aircraft structure. The aircraft structure comprises at least one wing and at least one vent stringer mounted to the wing. The vent stringer comprises a base portion, first and second web walls extending outwardly from the base portion, a cap portion, and an opening. The aircraft structure further comprises at least one fuel tank. The aircraft structure further comprises at least one vent dam mounted within the vent stringer. The vent dam comprises a contoured guiding surface for guiding fluid flow into and out of the vent stringer. The vent dam further comprises one or more side flanges extending from the contoured guiding surface for providing attachment of the vent dam to the vent stringer.

In another embodiment of the disclosure, there is provided a method for providing improved fluid flow in a vent stringer of a fuel vent system. The method comprises providing a vent dam comprising a contoured guiding surface and one or more side flanges extending from the contoured guiding surface. The method further comprises installing the vent dam in a vent stringer adjacent to an opening in the vent stringer. The method further comprises introducing a fluid flow through the opening in the vent stringer. The method further comprises using the contoured guiding surface to guide the fluid flow into and out of the vent stringer. The method further comprises using the contoured guiding surface to prevent turbulence in the fluid flow which results in a reduced pressure drop across the vent dam to improve fluid flow in the vent stringer of the fuel vent system.

In another embodiment of the disclosure, there is provided a method for providing improved fuel flow in a vent stringer in a fuel tank. The method comprises providing a vent dam comprising a first piece joined to a second piece with an overlapping configuration at a seam formed between the first piece and the second piece, the vent dam further comprising a contoured guiding surface and one or more side flanges extending from the contoured guiding surface. The method further comprises attaching the one or more side flanges of the vent dam to one or more interior portions of the vent stringer in the fuel tank, the vent dam being adjacent to an opening in the vent stringer. The method further comprises introducing a fuel flow through the opening in the vent stringer. The method further comprises using the contoured guiding surface to guide the fuel flow into and out of the vent stringer. The method further comprises using the contoured guiding surface to prevent turbulence in the fuel flow which results in a reduced pressure drop across the vent dam to improve fuel flow in the vent stringer in the fuel tank.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein:

FIG. 7 is an illustration of a top view of vent stringers with an embodiment of vent dams of the disclosure;

FIG. 8 is an illustration of a close-up view of circled portion 8 of FIG. 7 showing a top view of an embodiment of a vent dam of the disclosure used as a fuel tank boundary;

FIG. 9 is an illustration of a close-up view of circled portion 9 of FIG. 7 showing fluid flow through a left main tank climb port;

FIG. 10 is an illustration of a close-up view of circled portion 10 of FIG. 9 showing a perspective view of an embodiment of a vent dam of the disclosure used to guide fluid flow into a vent stringer;

FIG. 11 is an illustration of a cross-sectional view of an embodiment of a vent dam of the disclosure having a sloped guiding surface;

FIG. 12 is an illustration of a cross-sectional view of an embodiment of a vent dam of the disclosure having a sloped guiding surface;

FIGS. 13A-13D are illustrations of views of an embodiment of a vent dam of the disclosure;

FIG. 13E is an illustration of a front perspective view of the vent dam of FIG. 13A installed in a vent stringer;

FIG. 13F is an illustration of a cross-sectional view of the vent dam taken along line 13F-13F of FIG. 13E showing an embodiment of an attachment element for connecting the pieces of the vent dam;

FIG. 13G is an illustration of a bottom view of the vent stringer with the vent dam of FIG. 13A installed in the vent stringer;

FIG. 13H is an illustration of a cross-sectional view of the vent dam taken along line 13H-13H of FIG. 13G showing an embodiment of a fastener element for connecting the vent dam to the vent stringer;

FIGS. 14A-14D are illustrations of views of another embodiment of a vent dam of the disclosure;

FIG. 14E is an illustration of a front perspective view of the vent dam of FIG. 14A installed in a vent stringer;

FIG. 14F is an illustration of a bottom perspective view of the vent dam of FIG. 14A installed in the vent stringer;

FIG. 14G is an illustration of a perspective view of the vent dam of FIG. 14A without any flange holes;

FIG. 16E is an illustration of a cut-away front view of the vent dam of FIG. 16A installed in a vent stringer;

FIG. 16F is an illustration of a bottom perspective view of the vent dam of FIG. 16A installed in a vent stringer;

FIGS. 18A-18D are illustrations of views of another embodiment of a vent dam of the disclosure;

FIGS. 21A-21D are illustrations of views of another embodiment of a vent dam of the disclosure;

FIG. 21E is an illustration of a perspective view of the vent dam of FIG. 21A without any flange holes;

FIG. 22 is an illustration of a front perspective view of an embodiment of a vent dam of the disclosure installed in a vent stringer with sealant material;

FIG. 23 is an illustration of a bottom view of the vent dam of FIG. 22 showing the vent dam installed in the vent stringer with sealant material;

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and will fully convey the scope of the disclosure to those skilled in the art.

Figure 1:
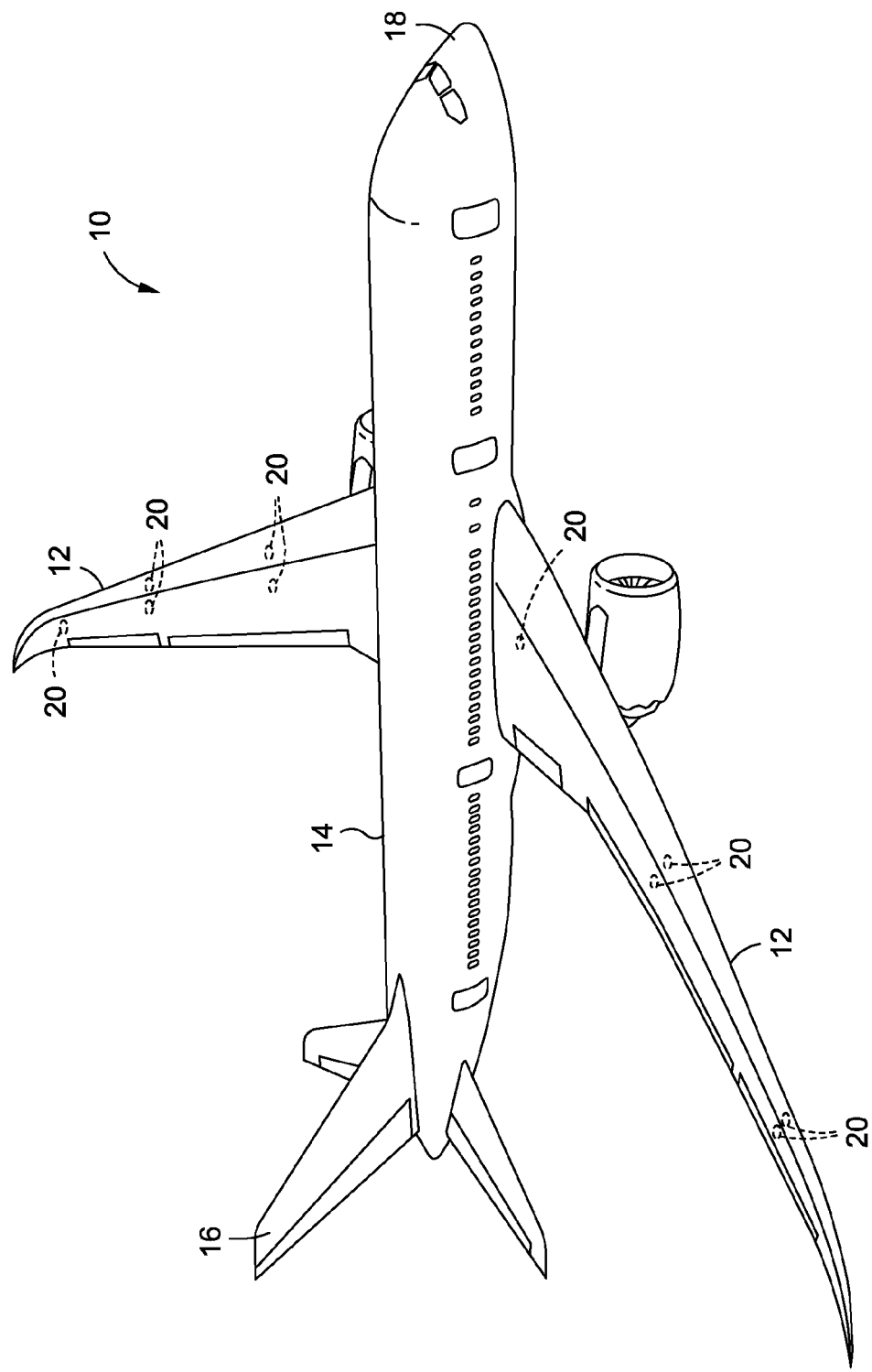
FIG. 1 is an illustration of a perspective view of an aircraft which may incorporate one or more advantageous embodiments of the vent dam of the disclosure.

FIG. 1 is an illustration of a perspective view of an aircraft 10 which may incorporate one or more advantageous embodiments of a vent dam 20 of the disclosure. The aircraft 10 may be made from composite and/or metallic parts that may be used on portions of the aircraft 10, including but not limited to, wings 12, a fuselage 14, a tail 16, and a nose 18. One or more vent dams 20 may be positioned on one or both wings 12. Although the vent dam 20 is shown in an exemplary embodiment as used in an aircraft, the vent dam 20 may also be used in other structures where a structural element may be used as a fuel venting conduit or a venting conduit.

Figure 2:
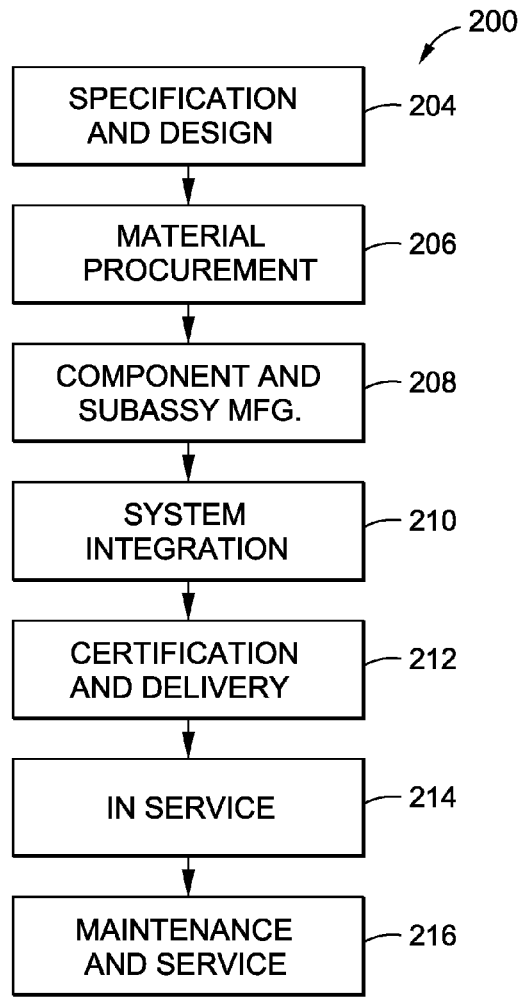
FIG. 2 is an illustration of a flow diagram of an aircraft production and service methodology.
Figure 3:
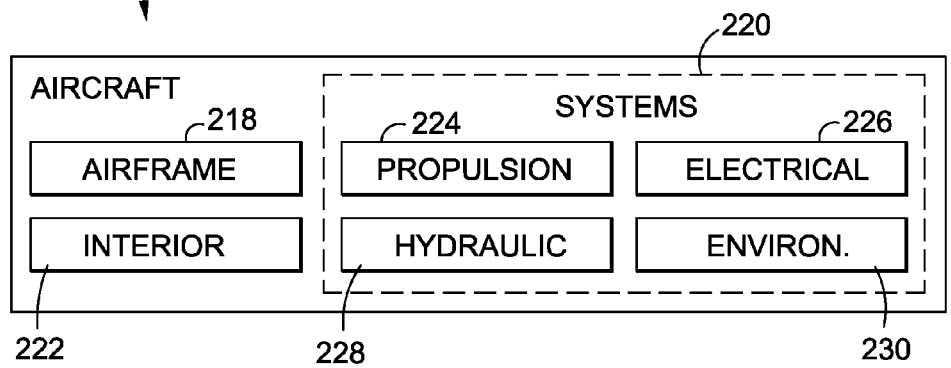
FIG. 3 is an illustration of a functional block diagram of an aircraft.

FIG. 2 is a flow diagram of an aircraft production and service methodology 200. FIG. 3 is a functional block diagram of an aircraft 202. Referring to FIGS. 2-3, embodiments of the disclosure may be described in the context of the aircraft manufacturing and service method 200 as shown in FIG. 2 and the aircraft 202 as shown in FIG. 3. During pre-production, exemplary method 200 may include specification and design 204 of the aircraft 202 and material procurement 206. During production, component and subassembly manufacturing 208 and system integration 210 of the aircraft 202 takes place. Thereafter, the aircraft 202 may go through certification and delivery 212 in order to be placed in service 214. While in service by a customer, the aircraft 202 is scheduled for routine maintenance and service 216 (which may also include modification, reconfiguration, refurbishment, and so on).

Each of the processes of method 200 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 3, the aircraft 202 produced by exemplary method 200 may include an airframe 218 with a plurality of systems 220 and an interior 222. Examples of high-level systems 220 include one or more of a propulsion system 224, an electrical system 226, a hydraulic system 228, and an environmental system 230. Any number of other systems may be included. Although an aerospace example is shown, the principles of the invention may be applied to other industries, such as the automotive industry.

Apparatus and methods embodied herein may be employed during any one or more of the stages of the production and service method 200. For example, components or subassemblies corresponding to production process 208 may be fabricated or manufactured in a manner similar to components or subassemblies produced while the aircraft 202 is in service. Also, one or more apparatus embodiments, method embodiments, or a combination thereof may be utilized during the production stages 208 and 210, for example, by substantially expediting assembly of or reducing the cost of an aircraft 202. Similarly, one or more of apparatus embodiments, method embodiments, or a combination thereof may be utilized while the aircraft 202 is in service, for example and without limitation, to maintenance and service 216.

Figure 4:
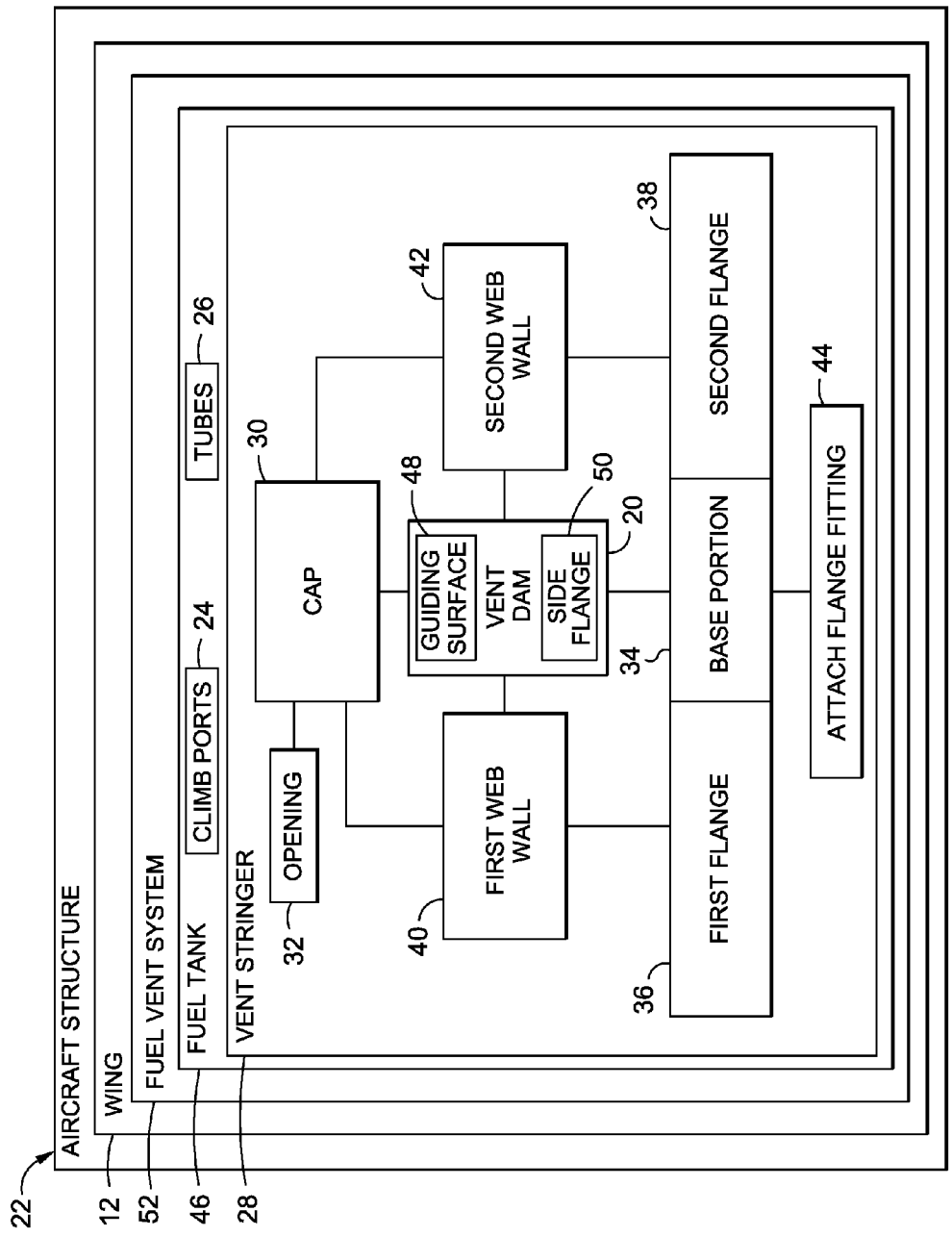
FIG. 4 is an illustration of a functional block diagram of an aircraft structure of a wing with a vent stringer having an embodiment of a vent dam of the disclosure.

FIG. 4 is an illustration of a functional block diagram of an aircraft structure 22. The aircraft structure 22 comprises at least one wing 12 having a fuel vent system 52. The aircraft structure 22 further comprises one or more fuel tanks 46 with climb ports 24 and tubes 26. The aircraft structure 22 further comprises at least one vent stringer 28. The vent stringer 28 comprises a cap portion 30 and an opening 32. The vent stringer 28 further comprises a base portion 34 having a first flange 36 and a second flange 38. The vent stringer 28 further comprises a first web wall 40 extending outwardly from the first flange 36 of the base portion 34. The vent stringer 28 further comprises a second web wall 42 extending outwardly from the second flange 38 of the base portion 34. The vent stringer 28 may further comprise one or more attach flange fittings 44 which may be attached to the base portion 34 and may be further attached to the first and second web walls 40, 41. The vent stringer 28 is preferably within the one or more fuel tanks 46 and is preferably a part of the one or more fuel tanks 46.

The aircraft structure 22 further comprises at least one vent dam 20 mounted within the vent stringer 28. Preferably, the vent dam 20 is fluid dynamic to smoothly funnel fluid flow past the vent dam. Preferably, the vent dam 20 may be used in the fuel vent system 52 of various types of aircraft or other craft. The vent dam 20 comprises at least one contoured guiding surface 48 for guiding fluid flow 74 (see FIG. 9) into and out of the vent stringer 28. The contoured guiding surface 48 provides for smooth fluid flow 74 (see FIG. 9) by preventing or minimizing turbulence in the fluid flow which can result in reduced pressure drop. The fluid flow 74 may comprise a fuel flow 108 (see FIG. 15), a fuel vapor flow (not shown), inerting gasses (not shown), or another suitable fluid. The vent dam 20 further comprises one or more side flanges 50 (see FIG. 4 and FIG. 13A) extending from the contoured guiding surface 48 for providing attachment of the vent dam 20 to the vent stringer 28.

Figure 5:
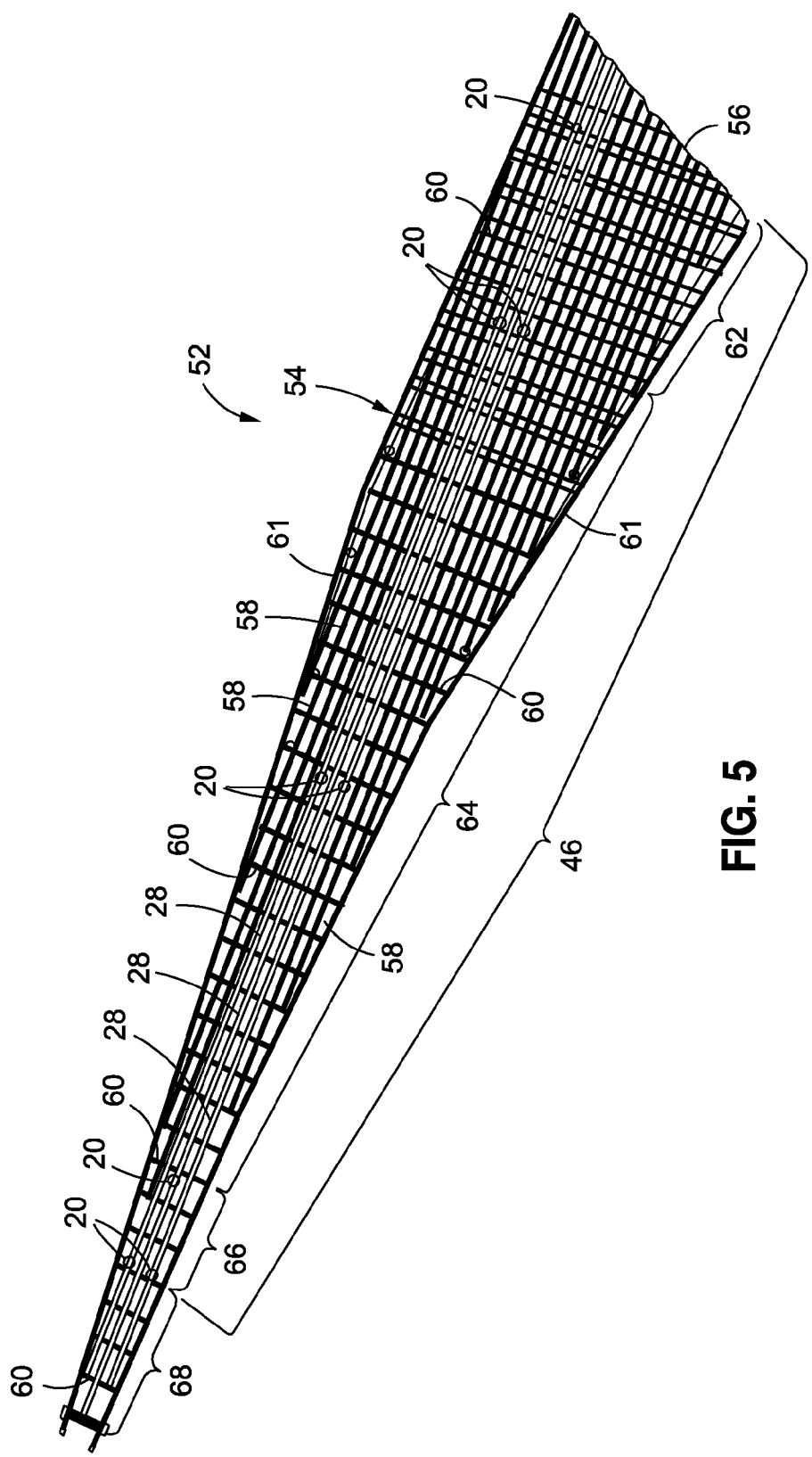
FIG. 5 is an illustration of a top view of a vent stringer system in a left aircraft wing box showing locations of vent stringers and an embodiment of vent dams of the disclosure.

FIG. 5 is an illustration of a top view of a fuel vent system 52 in a left aircraft wing box 54 with locations of the vent stringers 28 and embodiments of the vent dam 20 of the disclosure. An end 56 of the left aircraft wing box 54 is attached to an aircraft fuselage 14 (see FIG. 1). The fuel vent system 52 comprises vent stringers 28, non-vent stringers 58, and ribs 60. The vent stringers 28 may exist within one or more fuel tanks 46, including a center wing tank 62, a main wing tank 64, and a surge tank 66. The left aircraft wing box 54 may include one or more fuel tanks 46, and the fuel tanks 46 may use one or more vent stringers 28 to move fluid flow 74 (see FIG. 9). The fuel tanks 46 may be bound by ribs 60, spars 61, and wing skins (not shown). As can be seen in FIG. 5, the fuel vent system 52 has eight vent dams 20. However, the fuel vent system 52 may include more than eight vent dams or less than eight vent dams, depending on the type of aircraft used. In addition, the fuel vent system 52 may have the same number or a different number of vent dams 20 in the left wing as in the right wing.

Figure 6:
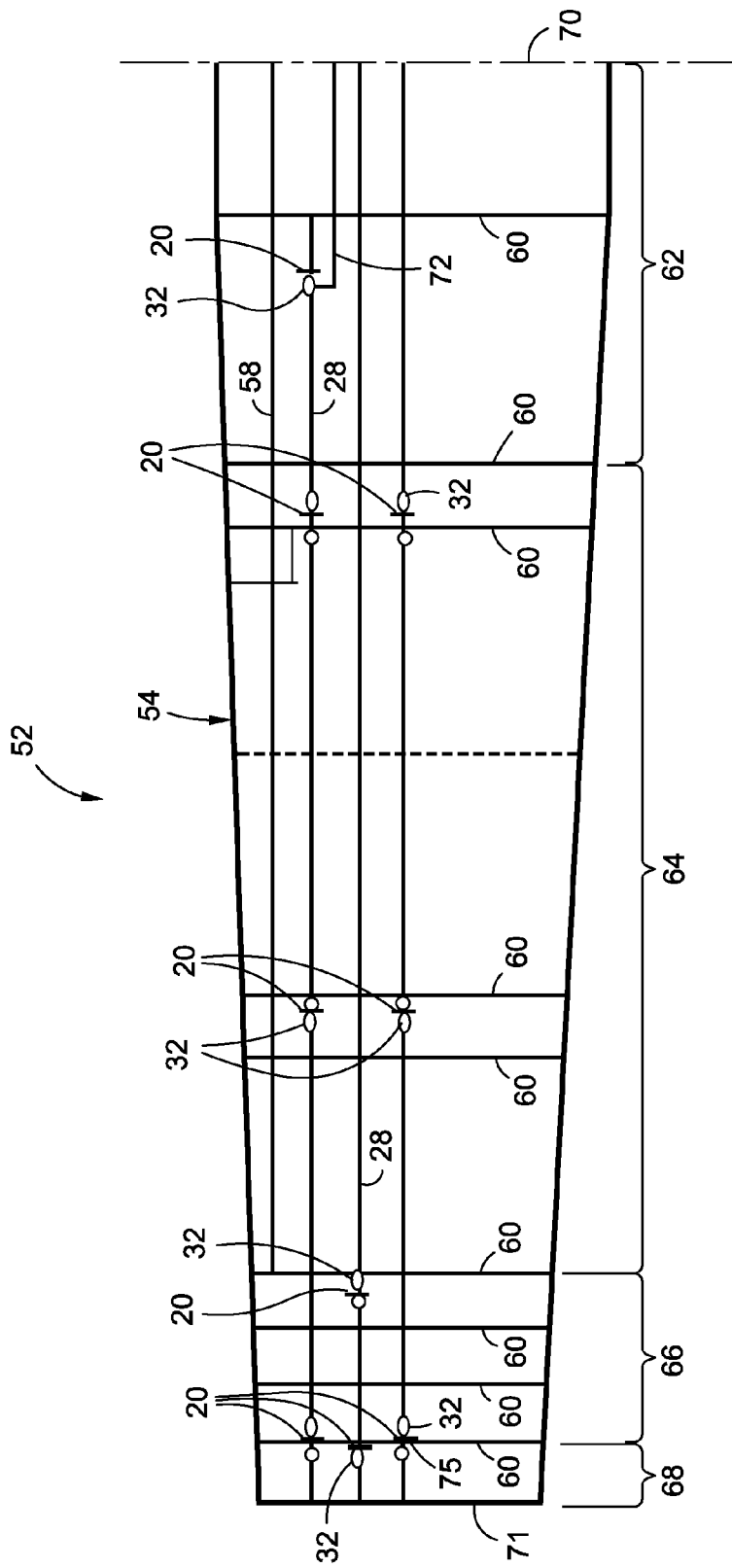
FIG. 6 is an illustration of a top close-up view of a vent stringer system of a left wing of an aircraft showing locations of vent stringers and an embodiment of vent dams of the disclosure.

FIG. 6 is an illustration of a top close-up view of the fuel vent system 52 in the left aircraft wing box 54 with locations of vent stringers 28 and embodiments of the vent dam 20 of the disclosure. FIG. 6 shows only certain vent stringers 28, non-vent stringers 58, and ribs 60, and also shows the center wing tank 62, the main wing tank 64, the surge tank 66, and a flammable leakage zone 68. Each vent dam 20 may be inserted through the opening 32 of the vent stringer 28 during installation. In one embodiment, the opening 32 that the vent dam 20 may be inserted through may comprise an access opening 33 in the cap portion 30 (see FIG. 14E) where the vent dam 20 is preferably positioned relative to or adjacent to the access opening 33 of the vent stringer 28.

In another embodiment as shown in FIG. 16F, the opening 32 that the vent dam 20 may be inserted through may comprise a base opening 35 between the first web wall 40 and the second web wall 42. As shown in FIG. 9, one or more vent dams 20 may guide fluid flow 74 out of the vent stringer 28 into a tube 72. Preferably, the tube 72 is made of metal or another suitable material. One or more vent dams 20 may prevent fluid flow 74 from flowing inboard 70 (see FIG. 6) and may guide the fluid flow 74 into the vent stringer 28. At other locations in the fuel vent system 52, vent dams 20 may guide fluid flow 74 inboard 70 or outboard 71 (see FIG. 6) depending on system requirements. As shown in FIG. 6, one or more vent dams 20 may serve as a barrier 75 between the surge tank 66 and the flammable leakage zone 68 or at other tank boundary locations in the fuel vent system 52.

FIG. 7 is an illustration of a top view of vent stringers 28 and an embodiment of the vent dam 20 of the disclosure, and also shows various ribs 60. FIG. 8 is an illustration of a close-up view of circled portion 8 of FIG. 7 showing a top view of an embodiment of vent dams 20 near the opening 32 and near rib 60. The vent dams 20 may serve as the barrier 75 between the surge tank 66 and the flammable leakage zone 68. FIG. 9 is an illustration of a close-up view of circled portion 9 of FIG. 7 showing fluid flow 74 through a left main tank climb port 76. One or more vent dams 20 may guide fluid flow 74 out of the tube 72 and into the vent stringer 28. One or more vent dams 20 may prevent fluid flow 74 from flowing inboard 70 and may guide the fluid flow 74 into the vent stringer 28. FIG. 10 is an illustration of a close-up view of circled portion 10 of FIG. 9 showing a perspective view of an embodiment of the vent dam 20 of the disclosure used to guide fluid flow 74 into the vent stringer 28 or out of the tube 72.

FIGS. 13A-FIG. 21E show various embodiments of the vent dam 20 disclosed herein for use in the fuel vent system 52. Preferably, the vent dam 20 is fluid dynamic and is a fuel vent dam 172 (see, for example, FIG. 15) for use in the structural vent stringer 28 within the fuel tank 46. The vent dam 20 comprises the contoured guiding surface 48 (see FIG. 4 and FIG. 13A) for guiding fluid flow 74 (see FIG. 9) into and out of the vent stringer 28. The vent dam 20 further comprises the one or more side flanges 50 (see FIG. 4 and FIG. 13A) extending from the contoured guiding surface 48 for providing attachment of the vent dam 20 within the vent stringer 28.

The contoured guiding surface 48 may be a curved guiding surface 78 (see FIG. 12). FIG. 12 is an illustration of a cross-sectional view of an embodiment of the vent dam 20 of the disclosure showing the curved guiding surface 78. The vent dam 20 is shown installed in the vent stringer 28 and relative to or adjacent to the opening 32 of the vent stringer 28. The curved guiding surface 78 may be tangent to the vent stringer 28 at points 80. However, the curved guiding surface 78 does not require tangency to function effectively. In another embodiment, the contoured guiding surface 48 may be a sloped guiding surface 82 (see FIG. 11). FIG. 11 is an illustration of a cross-sectional view of an embodiment of the vent dam 20 of the disclosure showing the sloped guiding surface 82. The vent dam 20 is shown installed in the vent stringer 28 and relative to or adjacent to the opening 32 of the vent stringer 28. The sloped guiding surface 82 may be sloped at an angle (not shown) in a range of from about 10 degrees to about 170 degrees. Preferably, as shown in FIG. 11, the sloped guiding surface 82 is sloped at an angle 84 in a range of from about 30 degrees to about 60 degrees. The angle 84 shown is from point 86 on the sloped guiding surface 82 to point 88 on a lower end 90 of the opening 32 of the vent stringer 28. Most preferably, the sloped guiding surface 82 is sloped at an angle 92 of about 45 degrees.

The vent dam 20 may comprise a two piece vent dam 20A (shown in FIG. 13A). The vent dam 20 may also comprise a one piece vent dam 20C (shown in FIG. 16A). The vent dam 20 may also comprise more than two pieces. The one or more side flanges 50 may be mechanically attached to the vent stringer 28 via one or more fastener elements 94 (see FIGS. 13E and 13H). The fastener elements 94 may comprise a mechanical fastener 96, such as a threaded bolt 115 (see FIG. 13H). The fastener element 94 may further comprise rivets (not shown) or another suitable fastener element. In another embodiment, the one or more side flanges 50 may be bonded or adhered to the vent stringer 28 via a bonding agent 98 (see FIGS. 22-23). The bonding agent 98 may comprise an epoxy, an adhesive, a sealant, or another suitable bonding agent. The vent dam 20 may be made of a material comprising a composite material, such as a carbon fiber reinforcement plastic (CFRP), a carbon fiber impregnated fabric, nylon, a carbon fiber laminate, polyaryletheretherketone (PEEK), or another suitable composite material. Alternatively, the vent dam 20 may be made of a metal material, such as aluminum, titanium, or another suitable metal material. Preferably, the vent dam 20 is made of a material that is compatible with a material that the vent stringer 28 is made of and/or a material that the aircraft 10 is made of. For example, if the vent stringer 28 and aircraft 10 are made of a composite material, the vent dam 20 is preferably made of a composite material that is compatible with the composite material of the vent stringer 28 and the aircraft 10. Similarly, if the vent stringer 28 and aircraft 10 are made of a metal material, the vent dam 20 is preferably made of a metal material that is compatible with the metal material of the vent stringer 28 and the aircraft 10. Preferably, the one or more fastener elements 94 may be in the form of mechanical fasteners 96, such as threaded bolts or rivets (not shown), for vent dams 20 made of a metal material. Alternatively, the vent dam 20 made of a metal material may be bonded in place with the bonding agent 98. If the vent dam 20 is made of a composite material, the one or more fastener elements 94 may be in the form of mechanical fasteners 96, such as threaded bolts or rivets (not shown), or the vent dam 20 may be bonded to the vent stringer 28 with the bonding agent 98. Preferably, the embodiments of the vent dam 20 disclosed herein are of a size and configuration that enable the vent dam 20 to be inserted and installed through the opening 32 in the vent stringer 28.

FIGS. 13A-13D are illustrations of views of an embodiment of the vent dam 20 in the form of a two piece vent dam 20A of the disclosure. FIG. 13A is an illustration of a front perspective view of the two piece vent dam 20A. The two piece vent dam 20A is fluid dynamic and is preferably for use in the fuel vent system 52 (see FIG. 5) and in the fuel tank 46 (see FIG. 5) of various aircraft. The two piece vent dam 20A comprises a first piece 100 that can be joined to a second piece 102. FIG. 13A shows the first piece 100 joined to the second piece 102 with an overlapping configuration 104 at a seam 106 formed between the first piece 100 and the second piece 102. FIG. 13B is an illustration of the two piece vent dam 20A of FIG. 13A with the first piece 100 separated from the second piece 102. FIG. 13C is an illustration of a back view of the first piece 100 of the two piece vent dam 20A of FIG. 13A. FIG. 13D is an illustration of a back view of the second piece 102 of the two piece vent dam 20A of FIG. 13A. The first piece 100 and the second piece 102 of the two piece vent dam 20A each further comprise curved guiding surface 78 for guiding fuel flow 108 (see FIG. 15) into and out of the vent stringer 28. The curved guiding surface 78 provides for smooth fuel flow 108 by preventing or minimizing turbulence which can result in decreased pressure drop.

The two piece vent dam 20A further comprises one or more side flanges 50 extending from each curved guiding surface 78 for providing either mechanical or bonding attachment of the two piece vent dam 20A to the vent stringer 28. The side flanges 50 may have one or more flange holes 110 in which the one or more fastener elements 94 (see FIG. 13H) may be inserted to fasten and secure the two piece vent dam 20A to the vent stringer 28. As shown in FIG. 13F, the two piece vent dam 20A may further comprise one or more attachment elements 112 for joining or attaching the first piece 100 to the second piece 102. The attachment element 112 may comprise a mechanical fastener 96 such as a threaded bolt 114 (see FIG. 13F). The attachment element 112 may further comprise rivets or another suitable attachment element. The attachment element 112 may be inserted through a hole 116 (FIG. 13B) in the first piece 100 and through a slotted hole 118 (FIG. 13B) for tolerance in the second piece 102. The slotted hole 118 may have a cavity 120 having a sufficient shape and depth to sink a head 121 of the threaded bolt 114 and fair it in flush with the contoured guiding surface 48 of the two piece vent dam 20A. The threaded bolt 114 may be grounded through contact with a threaded insert 124 shared between the two piece vent dam 20A and the vent stringer 28. A grounding path 126 is shown with arrows. The threaded bolt 114 may be embedded in a portion 128 of the first piece 100.

FIG. 13E is an illustration a front perspective view of the two piece vent dam 20A of FIG. 13A installed in the vent stringer 28. FIG. 13E shows the two piece vent dam 20A installed within the vent stringer 28 and attached to both the vent stringer 28 and attached flange fitting 44 with fastener elements 94. FIG. 13F is an illustration of a cross-sectional view of the vent dam 20A taken along line 13F-13F of FIG. 13E showing the attachment element 112 in the form of threaded bolt 114 for connecting the first piece 100 and the second piece 102 of the vent dam 20A. FIG. 13G is an illustration of a bottom view of the vent stringer 28 with the vent dam 20A of FIG. 13A installed in the vent stringer 28. FIG. 13H is an illustration of a cross-sectional view of the vent dam 20A taken along line 13H-13H of FIG. 13G showing the mechanical fastener 94 in the form of threaded bolt 115 for connecting the vent dam 20A to the vent stringer 28. As shown in FIG. 13G, the attach flange fitting 44 is attached over the vent stringer 28, and the opening 32 in the form of access opening 33 of the vent stringer 28 shows the first piece 100 and the second piece 102 of the two piece vent dam 20A.

As shown in FIG. 13H, the mechanical fastener 94, in the form of threaded bolt 115, may be inserted through the hole 110 of the side flange 50, and inserted and grounded through a sleeved interference fit fastener 132 shared with the vent stringer 28 and shared with the attach flange fitting 44. A collar 130 may be attached against an outer portion 134 of the attach flange fitting 44 to secure the threaded bolt 115 in place. The collar 130 may be fillet sealed. A fastener head 136 is preferably interior to the vent stringer 28. If mechanically fastened, a potential ground path 138 may be provided through the mechanical fastener 94. In this embodiment, the two piece vent dam 20A design is preferably inserted through and fits through the opening 32 in the form of access opening 33 of the vent stringer 28 and allows for reliable sealing of each first piece 100 and second piece 102 to one or more interior portions 139 of the vent stringer 28 (see FIG. 13H). The two piece vent dam 20A may be made of a suitable composite material, metal material, or other suitable material.

FIGS. 14A-14D are illustrations of views of another embodiment of vent dam 20 in the form of a two piece vent dam 20B. FIG. 14A is an illustration of a front perspective view of the two piece vent dam 20B. The two piece vent dam 20B is preferably fluid dynamic and is preferably a fuel vent dam 172 for use in the vent stringer 28 within the fuel tank 46 (see FIG. 15) of various aircraft. The two piece vent dam 20B is similar to the two piece vent dam 20A, except the two piece vent dam 20B does not have one or more attachment elements 112 for attaching the first piece 100 to the second piece 102. In addition, the two piece vent dam 20B has one or more end flanges 140 that may have one or more end flange holes 142 in which one or more fastener elements 94 (see FIG. 14E) may be inserted to fasten and secure the end flanges 140 of the two piece vent dam 20B to the vent stringer 28. The two piece vent dam 20B comprises first piece 100 that can be joined to second piece 102 via mechanical fasteners or bonding agents.

FIG. 14A shows the first piece 100 joined to the second piece 102 with the overlapping configuration 104 at the seam 106 formed between the first piece 100 and the second piece 102. The first piece 100 may be attached to the second piece 102 via bonding using bonding agent 98, such as an epoxy, an adhesive, or another suitable bonding material. FIG. 14B is an illustration of the two piece vent dam 20B of FIG. 14A with the first piece 100 separated from the second piece 102. The first piece 100 and the second piece 102 of the two piece vent dam 20B each further comprise curved guiding surface 78 and one or more side flanges 50 extending from each curved guiding surface 78. Each side flange 50 may have one or more flange holes 110 in which one or more fastener elements 94 (see FIG. 13H) may be inserted to fasten and secure the two piece vent dam 20B to the vent stringer 28. FIG. 14C is an illustration of a front view of the two piece vent dam 20B of FIG. 14A attached to the vent stringer 28. FIG. 14D is an illustration of an outer side view of the second piece 102 of the two piece vent dam 20B of FIG. 14A showing the curved guiding surface 78 and the bend radius 79. FIG. 14E is an illustration of a front perspective view of the two piece vent dam 20B of FIG. 14A installed in the vent stringer 28. The two piece vent dam 20B may be inserted through the opening 32 in the form of access opening 33 on the cap portion 30 of the vent stringer 28 and attached within the vent stringer 28. The two piece vent dam 20B is preferably attached so that it is flush against interior portions 139 of the vent stringer 28. As shown in FIG. 14E, the vent stringer 28 is preferably adjacent to an upper wing skin 141. FIG. 14F is an illustration of a bottom perspective view of the two piece vent dam 20B of FIG. 14A installed in the vent stringer 28. The two piece vent dam 20B may be made of a suitable composite material, a suitable metal material, or another suitable material. FIG. 14G is an illustration of a perspective view of the vent dam 20B of FIG. 14A without any side flange holes 110 and without any end flange holes 142, which is a preferred configuration if the vent dam 20B is bonded to the vent stringer 28 rather than mechanically fastened.

Figure 15:
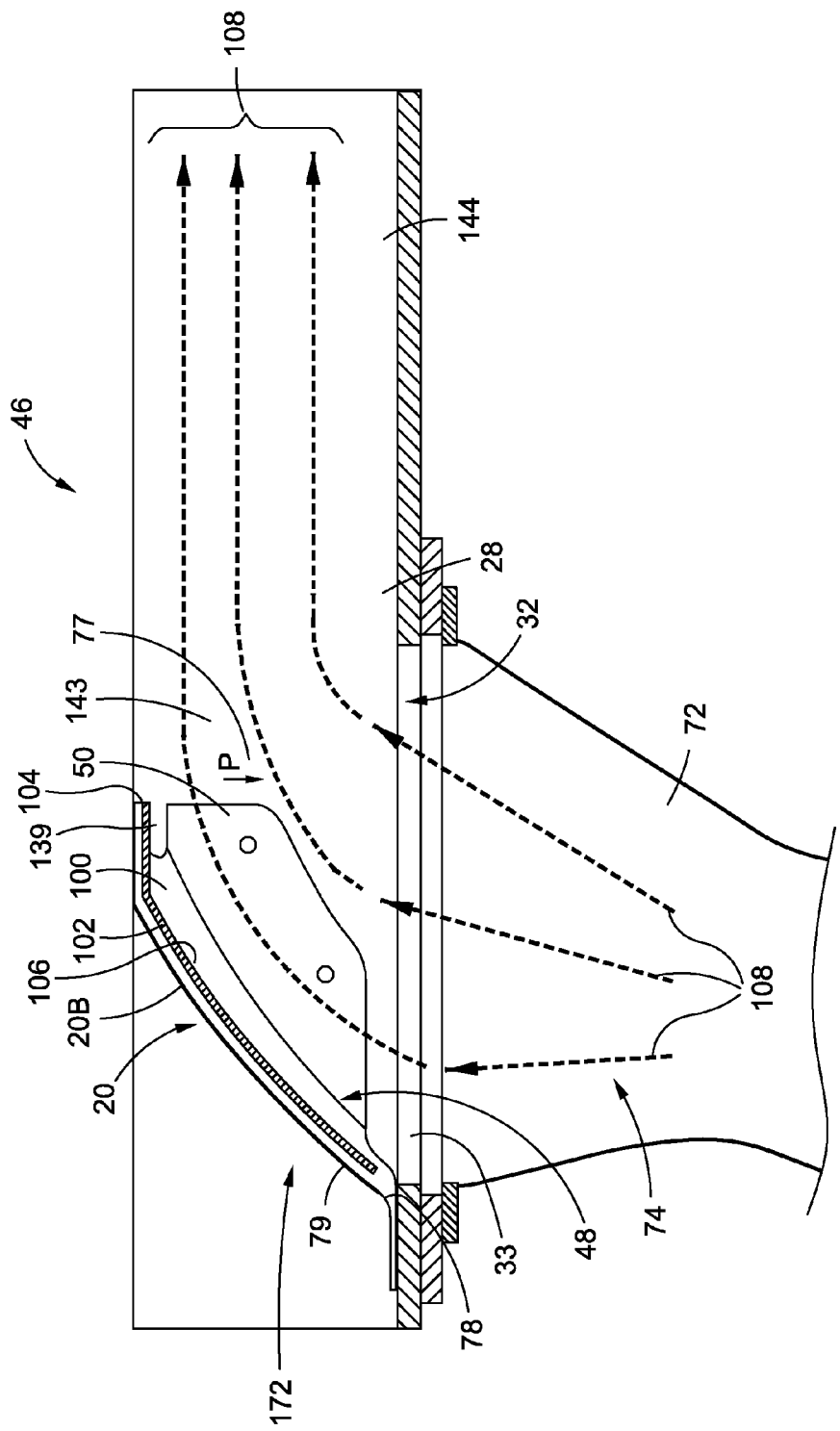
FIG. 15 is an illustration of a cut-away side view of the vent dam installed in a vent stringer and showing fuel flow.

FIG. 15 is an illustration of a cut-away side view of the vent dam 20 in the form of the two piece vent dam 20B installed in the vent stringer 28 within the fuel tank 46. The vent dam 20, in the form of two piece vent dam 20B, comprises the first piece 100 joined to the second piece 102 with the overlapping configuration 104 at the seam 106 (see also FIG. 14A) formed between the first piece 100 and the second piece 102. Preferably, the vent dam 20 is a fuel vent dam 172 comprising the contoured guiding surface 48 in the form of the curved guiding surface 78. Preferably, the vent dam 20 further comprises one or more side flanges 50 extending from the contoured guiding surface 48. The one or more side flanges 50 of the vent dam 20 are preferably attached to one or more interior portions 139 of the vent stringer 28 of the fuel tank 46. The vent dam 20, in the form of the fuel vent dam 172, is preferably installed adjacent to the opening 32, in the form of access opening 33, in the vent stringer 28.

FIG. 15 shows fuel flow 108 (as indicated with arrows) entering from tube 72 attached to the vent stringer 28 and entering through the opening 32 into an interior 143 of the vent stringer 28. The contoured guiding surface 48 of the vent dam 20 guides the fuel flow 108 that enters or is introduced through the opening 32 and directs the fuel flow 108 down a vent stringer channel 144. The contoured guiding surface 48 guides the fuel flow 108 into and out of the vent stringer 28. The contoured guiding surface 48, in the form of the curved guiding surface 78, is preferably designed to smoothly expand or funnel the fuel flow 108 away from the opening 32, in the form of access opening 33. Alternatively, the contoured guiding surface 48 may guide the fuel flow 108 towards the opening 32. The contoured guiding surface 48 preferably prevents turbulence (not shown) in the fuel flow 108, which results in a reduced pressure drop 77 (see FIG. 15 ($\downarrow$P)) across the vent dam 20B to improve fuel flow in the vent stringer 28 in the fuel tank 46. Improved fuel flow may include increased speed of the fuel flow through the fuel tank and the fuel vent system and increased efficiency of the fuel flow through the fuel tank and the fuel vent system. The resistance coefficient (K) for fuel flow 108 past the vent dam 20B is preferably improved over the value assigned to a known 90° (degree) miter bend. A bend radius 79 on the contoured guiding surface 48, in the form of the curved guiding surface 78, can facilitate the reduced pressure drop 77 and improved fuel flow. Because the resistance coefficient (K) is a function of the bend radius 79 of the vent dam 20, the performance of the vent dam 20 can be optimized by maximizing the bend radius 79 of the contoured guiding surface 48 within the vent stringer channel 144. Generally, as long as the fuel flow is not impeded, the larger the bend radius of the contoured guiding surface, the lower the pressure drop across the vent dam. Given that one or more vent dams 20 may be utilized in the fuel tanks 46 throughout the fuel vent system 52 (see FIG. 5), and the reduced pressure drop is additive, increased fuel flow speed and efficiency can be realized.

Figure 16A:
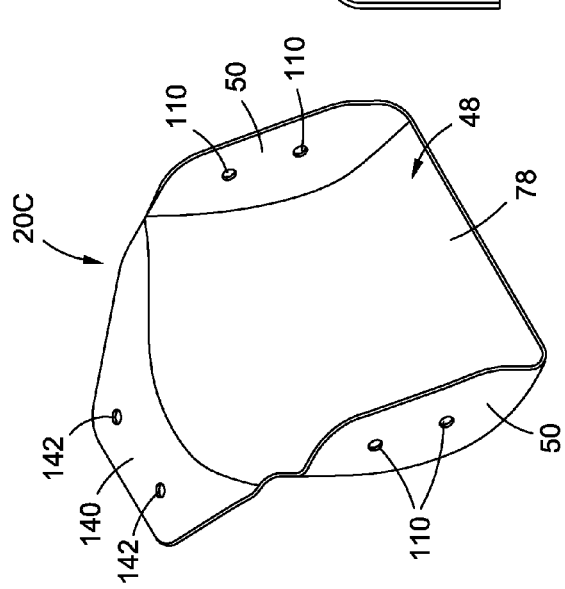
FIGS. 16A-16D are illustrations of views of another embodiment of a vent dam of the disclosure.
Figure 16B:
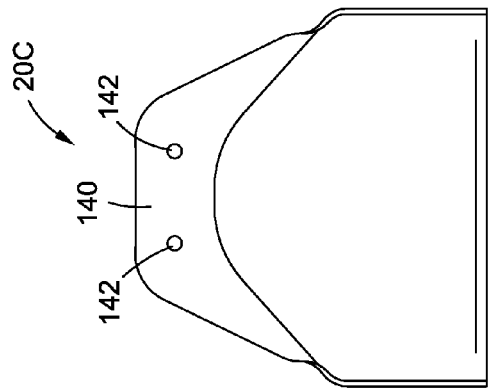
Figure 16C:
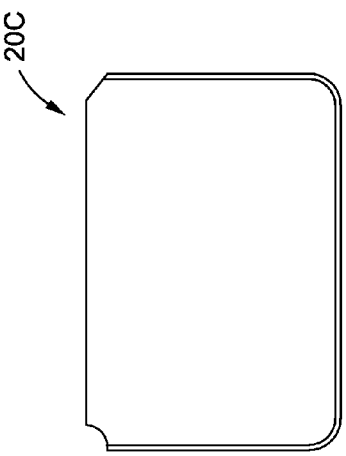
Figure 16D:
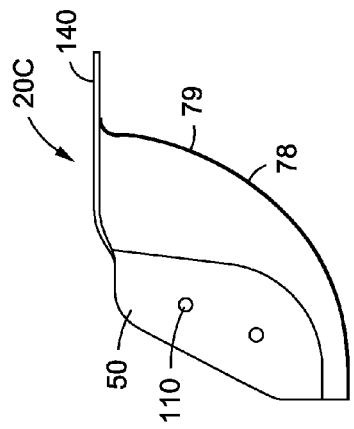
Figure 16I:
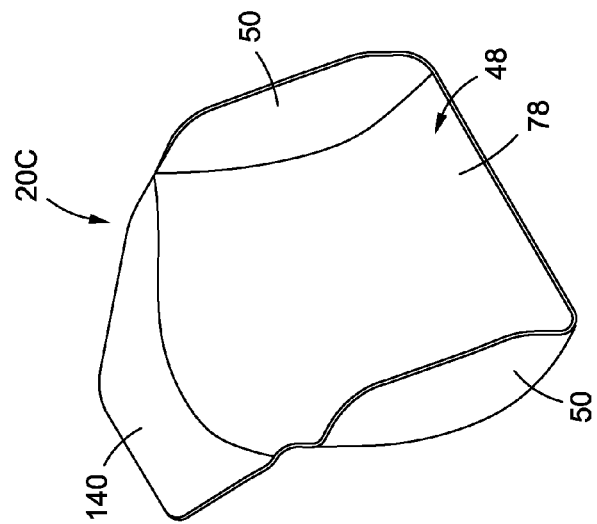
FIG. 16I is an illustration of a perspective view of the vent dam of FIG. 16A without any flange holes.
Figure 16G:
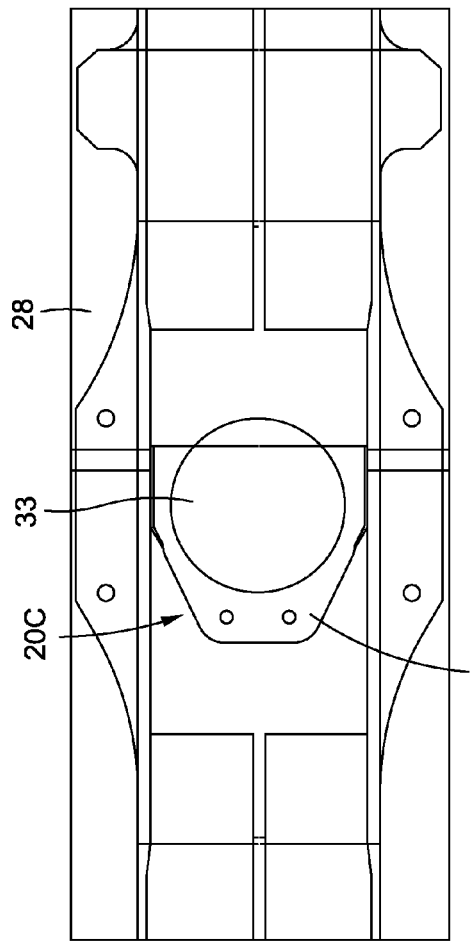
FIG. 16G is an illustration of a bottom view of the vent dam of FIG. 16A installed in a vent stringer.
Figure 16H:
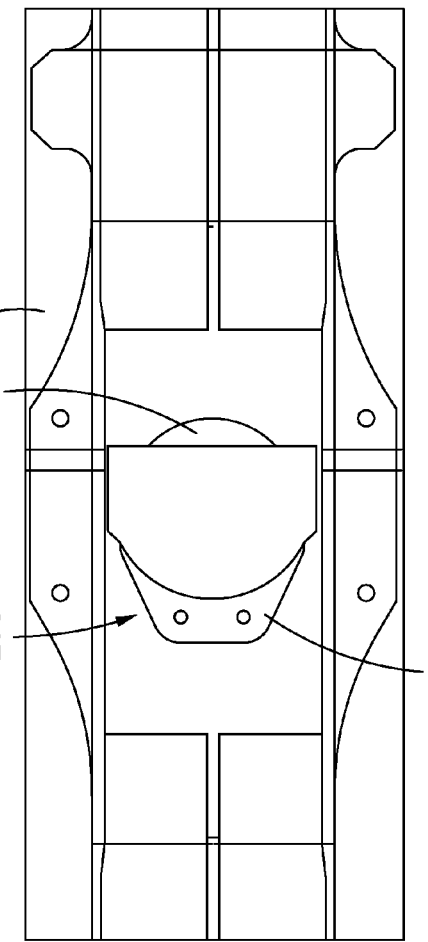
FIG. 16H is an illustration of a top view of the vent dam of FIG. 16A installed in a vent stringer.

FIGS. 16A-16D are illustrations of views of another embodiment of vent dam 20 in the form of a one piece vent dam 20C. FIG. 16A is an illustration of a perspective view of the one piece vent dam 20C. FIG. 16B is an illustration of a front view of the one piece vent dam 20C of FIG. 16A. FIG. 16C is an illustration of a back view of the one piece vent dam 20C of FIG. 16A. FIG. 16D is an illustration of a side view of the one piece vent dam 20C of FIG. 16A. The one piece vent dam 20C comprises contoured guiding surface 48 shown in the form of curved guiding surface 78 with bend radius 79 and one or more side flanges 50 extending from the curved guiding surface 78. Each side flange 50 may have one or more flange holes 110 in which one or more fastener elements 94 (see FIG. 13H) may be inserted to fasten and secure the two piece vent dam 20C to the vent stringer 28. The one piece vent dam 20C further comprises end flange 140 having one or more flange holes 142 in which one or more fastener elements 94 (see FIG. 13H) may be inserted to fasten and secure the end flange 140 of the two piece vent dam 20C to the vent stringer 28. FIG. 16E is an illustration of a cut-away front view of the one piece vent dam 20C of FIG. 16A installed in the vent stringer 28. The one piece vent dam 20C is preferably mated to the upper wing skin 141 as closely as possible. FIG. 16F is an illustration of a bottom perspective view of the one piece vent dam 20C of FIG. 16A installed in the vent stringer 28. FIG. 16G is an illustration of a bottom view of the one piece vent dam 20C of FIG. 16A installed in the vent stringer 28. FIG. 16H is an illustration of a top view of the one piece vent dam 20C of FIG. 16A installed in the vent stringer 28. The one piece vent dam 20C may be made of a suitable metal material, a suitable composite material, or another suitable material. FIG. 16I is an illustration of a perspective view of the vent dam 20C of FIG. 16A without any side flange holes 110 and without any end flange holes 142, which is a preferred configuration if the vent dam 20C is bonded to the vent stringer 28 rather than mechanically fastened.

Figure 17:
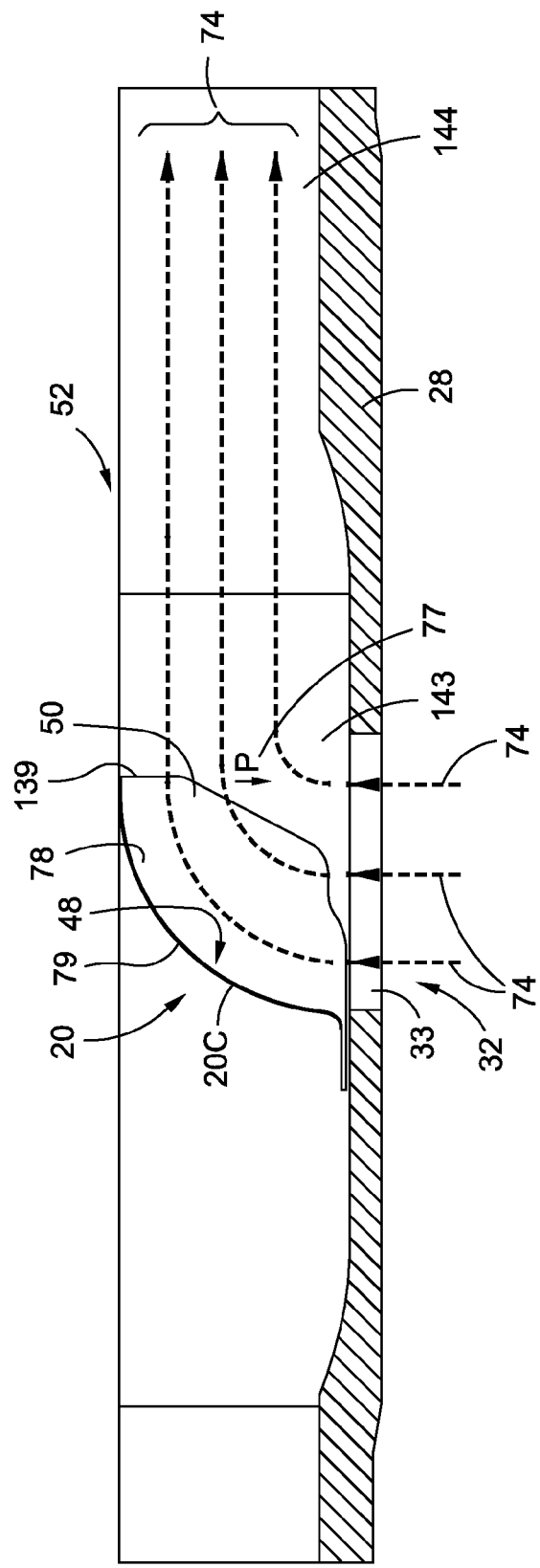
FIG. 17 is an illustration of a cut-away side view of the vent dam of FIG. 16A installed in a vent stringer and showing fluid flow.

FIG. 17 is an illustration of a cut-away side view of the vent dam 20 in the form of the one piece vent dam 20C of FIG. 16A installed in the vent stringer 28 and showing fluid flow 74. FIG. 17 shows the one piece vent dam 20C installed within the vent stringer 28. The vent dam 20, in the form of one piece vent dam 20C, comprises the contoured guiding surface 48 in the form of the curved guiding surface 78, and further comprises one or more side flanges 50 extending from the contoured guiding surface 48. The one or more side flanges 50 of the of the vent dam 20 are preferably attached to one or more interior portions 139 of the vent stringer 28 of the fuel vent system 52. The vent dam 20 is preferably installed adjacent to or relative to the opening 32, in the form of access opening 33, in the vent stringer 28.

FIG. 17 shows fluid flow 74 (as indicated with arrows) through the opening 32 into interior 143 of the vent stringer 28. The contoured guiding surface 48 of the vent dam 20, in the form of one piece vent dam 20C, guides the fluid flow 74 that enters or is introduced through the opening 32 and directs the fluid flow 74 down the vent stringer channel 144. The contoured guiding surface 48 guides the fluid flow 74 into and out of the vent stringer 28. The contoured guiding surface 48, in the form of the curved guiding surface 78, is preferably designed to smoothly expand or funnel the fluid flow 74 away from the opening 32, in the form of access opening 33. Alternatively, the contoured guiding surface 48 may guide the fluid flow 74 towards the opening 32. The contoured guiding surface 48 preferably prevents turbulence (not shown) in the fluid flow 74, which results in a reduced pressure drop 77 across the vent dam 20C to improve fluid flow in the vent stringer 28 of the fuel vent system 52. Improved fluid flow may include increased speed of the fluid flow through the fuel vent system and increased efficiency of the fluid flow through the fuel vent system. The resistance coefficient (K) for fluid flow 74 past the vent dam 20C may be improved over the value assigned to a known 90° (degree) miter bend. A bend radius 79 on the contoured guiding surface 48, in the form of the curved guiding surface 78, can facilitate the reduced pressure drop 77 and improved fluid flow. Because the resistance coefficient (K) is a function of the bend radius 79 of the vent dam 20, the performance of the vent dam 20 can be optimized by maximizing the bend radius 79 of the contoured guiding surface 48 within the vent stringer channel 144. Generally, as long as the fluid flow is not impeded, the larger the bend radius of the contoured guiding surface, the lower the pressure drop across the vent dam. Given that one or more vent dams 20 may be utilized throughout the fuel vent system 52 (see FIG. 5), and the reduced pressure drop is additive, increased fluid flow speed and efficiency can be realized.

FIGS. 18-A-18D are illustrations of views of another embodiment of vent dam 20 in the form of a two piece vent dam 20D having attachment element 112. The attachment element 112 is shown in the form of a male projecting portion 150 on the second piece 102 and a corresponding female slot portion 152 on the first piece 100 to connect the first piece 100 and the second piece 102 together. FIG. 18A is an illustration of a front perspective view of the two piece vent dam 20D. The two piece vent dam 20D comprises first piece 100 that may be joined to second piece 102 with the overlapping configuration 104 at the seam 106. The first piece 100 and the second piece 102 of the two piece vent dam 20D each further comprise curved guiding surface 78 and one or more side flanges 50 extending from each edge 154 of the curved guiding surface 78. Each side flange 50 may have one or more flange holes 110 in which one or more fastener elements 94 (see FIG. 13H) may be inserted to fasten and secure the two piece vent dam 20D to the vent stringer 28. The first piece 100 and the second piece 102 of the two piece vent dam 20D may each further comprise one or more end flanges 140 having one or more end flange holes 142 in which one or more fastener elements 94 (see FIG. 14E) may be inserted to fasten and secure the end flanges 140 to the vent stringer 28. Alternatively, the side flanges 50 and the end flanges 140 may be bonded to the vent stringer 28 with a bonding agent 98 rather than mechanically fastened. FIG. 18B is an illustration of the two piece vent dam 20D with the first piece 100 separated from the second piece 102. The first piece 100 may be securely attached to the second piece 102 by inserting the male projection portion 152 on the first piece 100 into the female slot portion 152 on the second piece 102. FIG. 18C is an illustration of a side view of the first piece 100 of the two piece vent dam 20D of FIG. 18A. FIG. 18C shows the curved guiding surface 78 with bend radius 79. FIG. 18D is an illustration of a back view of the second piece 102 of the two piece vent dam 20D of FIG. 18A. The two piece vent dam 20D may be made of a suitable composite material or another suitable material.

Figure 19A:
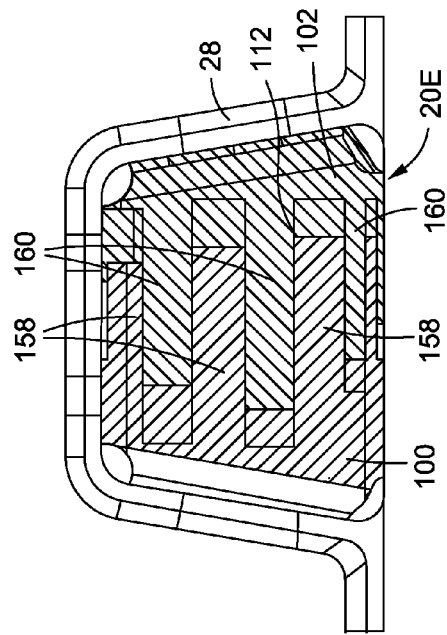
FIGS. 19A-19C are illustrations of views of another embodiment of a vent dam of the disclosure.
Figure 19C:
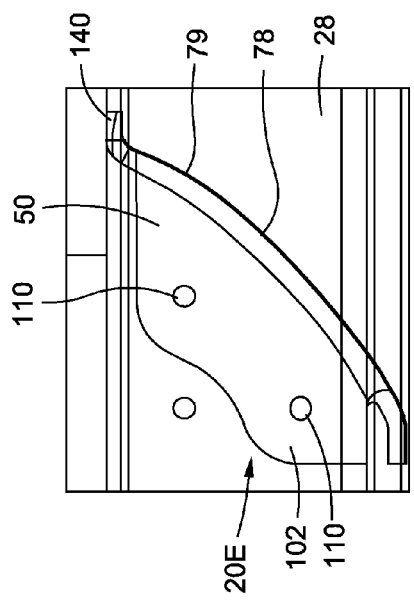
Figure 19B:
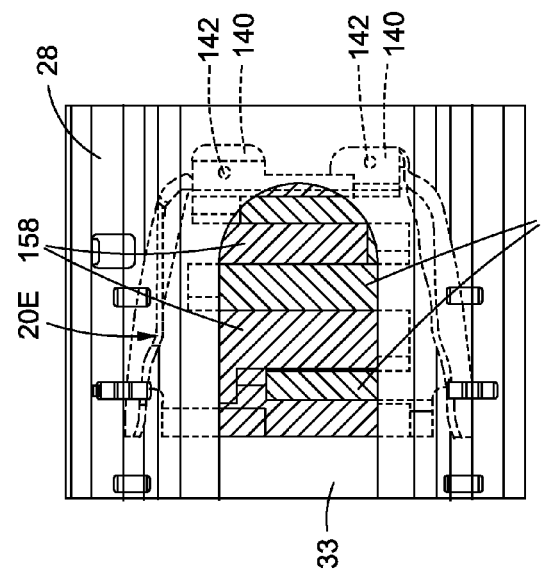

FIGS. 19A-19C are illustrations of views of another embodiment of vent dam 20 in the form of a two piece vent dam 20E having attachment element 112. The attachment element 112 is shown in the form of a first set of interlocking fingers 158 formed on the first piece 100 and a second set of interlocking fingers 160 formed on the second piece 102. The first set of interlocking fingers 158 interconnect with the second set of interlocking fingers 160 to securely join or connect the first piece 100 and the second piece 102 together. FIG. 19A is an illustration of a front view of the two piece vent dam 20E installed in the vent stringer 28. FIG. 19B is an illustration of a top view of the two piece vent dam 20E through the access opening 33 of the vent stringer 28. FIG. 19C is an illustration of a side view of the two piece vent dam 20E. The first piece 100 and the second piece 102 of the two piece vent dam 20E each comprise curved guiding surface 78 with bend radius 79 and one or more side flanges 50 extending from each curved guiding surface 78. Each side flange 50 may have one or more flange holes 110 in which one or more fastener elements 94 (see FIG. 13H) may be inserted to fasten and secure the two piece vent dam 20E to the vent stringer 28. The first piece 100 and the second piece 102 of the two piece vent dam 20E may each further comprise one or more end flanges 140 having one or more end flange holes 142 in which one or more fastener elements (see FIG. 14E) may be inserted to fasten and secure the end flanges 140 to the vent stringer 28. Alternatively, the side flanges 50 and the end flanges 140 may be bonded to the vent stringer 28 with a bonding agent 98 rather than mechanically fastened. The two piece vent dam 20E may be made of a suitable composite material or another suitable material.

Figure 20A:
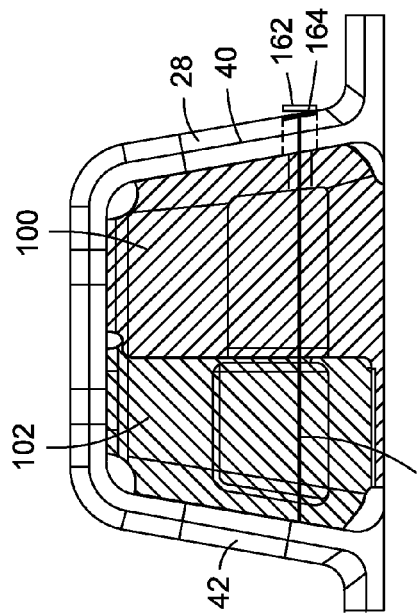
FIGS. 20A-20C are illustrations of views of another embodiment of a vent dam of the disclosure.
Figure 20C:
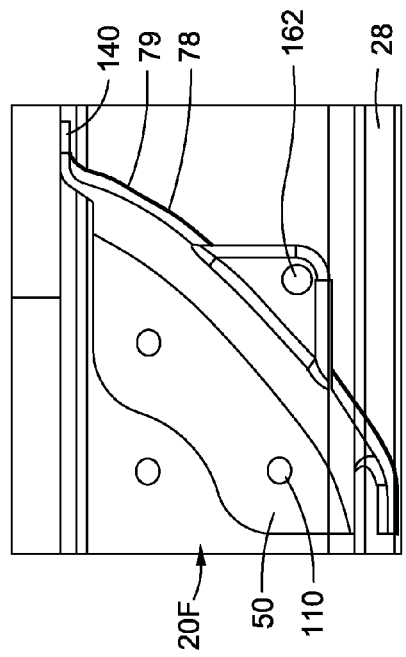
Figure 20B:
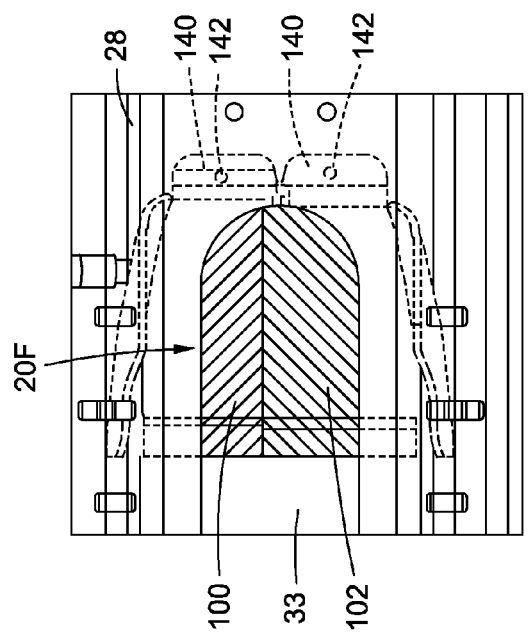

FIGS. 20A-20C are illustrations of views of another embodiment of vent dam 20 in the form of a two piece vent dam 20F having attachment element 112. The attachment element 112 is shown in the form of a pin 162 inserted through the first web wall 40 of the vent stringer 28 to securely join or connect the first piece 100 and the second piece 102 together. Alternatively, the pin 162 may be inserted through the second web wall 42 or through both the first web wall 40 and the second web wall 42. FIG. 20A is an illustration of a back view of the two piece vent dam 20F installed in the vent stringer 28. FIG. 20A shows the pin 162 entering through an opening 164 in the first web wall 40 and going through the first piece 100 and the second piece 102. FIG. 20B is an illustration of a top view of the two piece vent dam 20F through the access opening 33 of the vent stringer 28. FIG. 20C is an illustration of a side view of the two piece vent dam 20F. The first piece 100 and the second piece 102 of the two piece vent dam 20F each comprise the curved guiding surface 78 with bend radius 79 and one or more side flanges 50 extending from each curved guiding surface 78. Each side flange 50 may have one or more flange holes 110 in which one or more fastener elements 94 (see FIG. 13H) may be inserted to fasten and secure the two piece vent dam 20F to the vent stringer 28. The first piece 100 and the second piece 102 of the two piece vent dam 20F may each further comprise one or more end flanges 140 having one or more end flange holes 142 in which one or more fastener elements 94 (see FIG. 14E) may be inserted to fasten and secure the end flanges 140 to the vent stringer 28. Alternatively, the side flanges 50 and the end flanges 140 may be bonded to the vent stringer 28 with a bonding agent 98 rather than mechanically fastened. The two piece vent dam 20F may be made of a suitable composite material, a suitable metal material, or another suitable material.

FIGS. 21A-21D are illustrations of views of another embodiment of vent dam 20 in the form of a two piece vent dam 20G having the sloped guiding surface 82 rather than the curved guiding surface 78. FIG. 21A is an illustration of a front perspective view of the two piece vent dam 20G. The two piece vent dam 20G comprises first piece 100 that may be joined to second piece 102 with the overlapping configuration 104 at the seam 106. The first piece 100 and the second piece 102 of the two piece vent dam 20G each further comprise the sloped guiding surface 82 and one or more side flanges 50 extending from each sloped guiding surface 82. Each side flange 50 may have one or more flange holes 110 in which one or more fastener elements 94 (see FIG. 13H) may be inserted to fasten and secure the two piece vent dam 20G to the vent stringer 28. The first piece 100 and the second piece 102 of the two piece vent dam 20G may each further comprise one or more end flanges 140 on both ends 166. FIG. 21B is an illustration of a top view of the two piece vent dam 20G. FIG. 21C is an illustration of a back view of the two piece vent dam 20G. FIG. 21D is an illustration of a side view of the first piece 100 of the two piece vent dam 20G of FIG. 21A. FIG. 21E is an illustration of a perspective view of the vent dam 20G of FIG. 21A without any side flange holes 110, which is a preferred configuration if the vent dam 20G is bonded to the vent stringer 28 rather than mechanically fastened. The two piece vent dam 20G may be made of a suitable composite material or another suitable material.

FIG. 22 is an illustration of a front perspective view of an embodiment of vent dam 20 of the disclosure installed in the vent stringer 28 with the bonding agent 98. FIG. 23 is an illustration of a bottom view of the vent dam 20 of FIG. 22 showing the vent dam 20 installed in the vent stringer 28 with the bonding agent 98.

Figure 24:
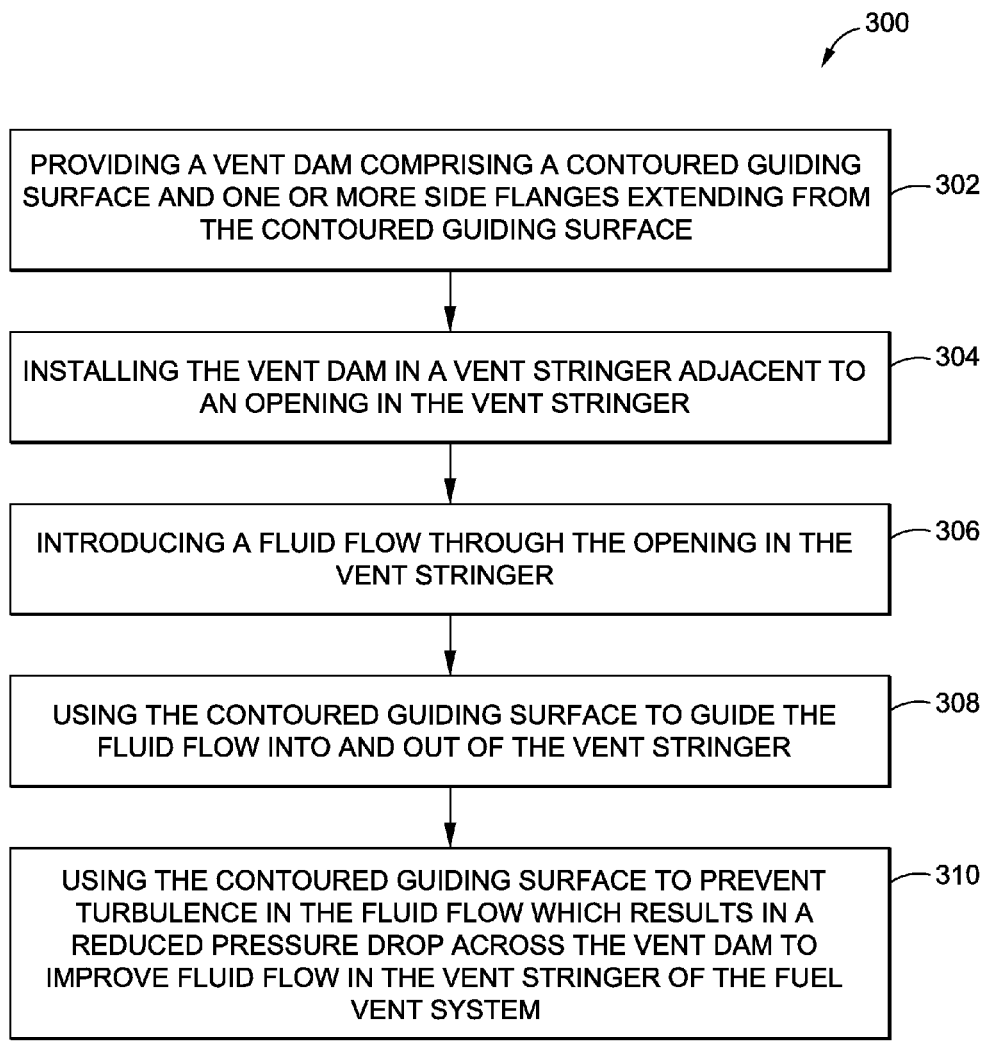
FIG. 24 is an illustration of a flow diagram of an embodiment of a method of the disclosure for providing improved fluid flow in a vent stringer system; and, FIG. 25 is an illustration of a flow diagram of another embodiment of a method of the disclosure for providing improved fuel flow in an aircraft using vent stringers for fuel tank venting.

FIG. 24 is an illustration of a flow diagram of an embodiment of a method 300 of the disclosure for providing improved fluid flow 74 in a fuel vent system 52 (see FIG. 17). The method 300 comprises step 302 of providing a vent dam 20, which for example, may be in the form of any of the vent dams 20A-20G (see FIGS. 13A-21E). The vent dam 20 may comprise a two piece vent dam 20A (FIG. 13A), 20B (FIG. 14A), 20D (FIG. 18A), 20E (FIG. 19A), 20F (FIG. 20A), and 20G (FIG. 21A). The vent dam 20 may also comprise a one piece vent dam 20C (see FIG. 16A). The vent dam 20 comprises a contoured guiding surface 48 and one or more side flanges 50 extending from the contoured guiding surface 48. The vent dam 20 comprises the contoured guiding surface 48, in the form of the curved guiding surface 78, and further comprises one or more side flanges 50 extending from the contoured guiding surface 48. In one of the embodiments as shown in FIG. 17, the contoured guiding surface 48 may be in the form of the curved guiding surface 78 and have a bend radius 79. In another of the embodiments as shown in FIG. 11, the contoured guiding surface 48 may be in the form of a sloped guiding surface 82 sloped at an angle 84 in a range of from about 30 degrees to about 60 degrees.

The method 300 further comprises step 304 of installing the vent dam 20 in a vent stringer 28 adjacent to an opening 32 in the vent stringer 28. In an exemplary embodiment as shown in FIG. 17, the vent dam 20C is installed within the vent stringer 28. The one or more side flanges 50 of the vent dam 20C are preferably attached to one or more interior portions 139 of the vent stringer 28 of the fuel vent system 52. In one of the embodiments, the one or more side flanges 50 may be mechanically attached to the vent stringer 28 via one or more fastener elements 94 (see FIG. 13H). In another one of the embodiments, the one or more side flanges 50 may be bonded to the vent stringer 28 with a bonding agent 98 (see FIGS. 22-23). The vent dam 20C is preferably installed adjacent to or relative to the opening 32, in the form of access opening 33, in the vent stringer 28. In one of the embodiments, the opening 32 that the vent dam 20 may be inserted through may comprise an access opening 33 in the cap portion 30 (see FIG. 14E) where the vent dam 20 is preferably positioned relative to or adjacent to the access opening 33 of the vent stringer 28. In another one of the embodiments, the opening 32 that the vent dam 20 may be inserted through may comprise a base opening 35 between the first web wall 40 and the second web wall 42 (see FIG. 16F).

The method 300 further comprises step 306 of introducing a fluid flow 74 (see FIG. 17) through the opening 32 in the vent stringer 28. FIG. 17 shows fluid flow 74 (as indicated with arrows) entering or being introduced through the opening 32 into interior 143 of the vent stringer 28. The method 300 further comprises step 308 of using the contoured guiding surface 48 to guide the fluid flow 74 into and out of the vent stringer 28. As shown in FIG. 17, the contoured guiding surface 48 of the vent dam 20C guides the fluid flow 74 that enters or is introduced through the opening 32 and directs the fluid flow 74 down the vent stringer channel 144. The contoured guiding surface 48 guides the fluid flow 74 into and out of the vent stringer 28. The contoured guiding surface 48 is designed to smoothly expand or funnel the fluid flow 74 past the vent dam 20 and preferably away from the opening 32. Alternatively, the contoured guiding surface 48 may guide the fluid flow 74 towards the opening 32.

The method 300 further comprises step 310 of using the contoured guiding surface 48 to prevent turbulence (not shown) in the fluid flow 74 which results in a reduced pressure drop 77 (see FIG. 17 (↓P)) across the vent dam 20 to improve fluid flow in the vent stringer 28 of the fuel vent system 52. Improved fluid flow may include increased speed of the fluid flow through the fuel vent system and increased efficiency of the fluid flow through the fuel vent system. The bend radius 79 (see FIG. 17) on the contoured guiding surface 48, in the form of the curved guiding surface 78, can facilitate the reduced pressure drop 77 and improved fluid flow. Because the resistance coefficient (K) is a function of the bend radius 79 of the vent dam 20, the performance of the vent dam 20 can be optimized by maximizing the bend radius 79 of the contoured guiding surface 48 within the vent stringer channel 144. Preferably, the larger the bend radius 79 of the contoured guiding surface 48, the lower the pressure drop 77 across the vent dam 20. Given that one or more vent dams 20 may be utilized throughout the fuel vent system 52 (see FIG. 5), and the reduced pressure drop is additive, increased fluid flow speed and efficiency can be realized.

Figure 25:
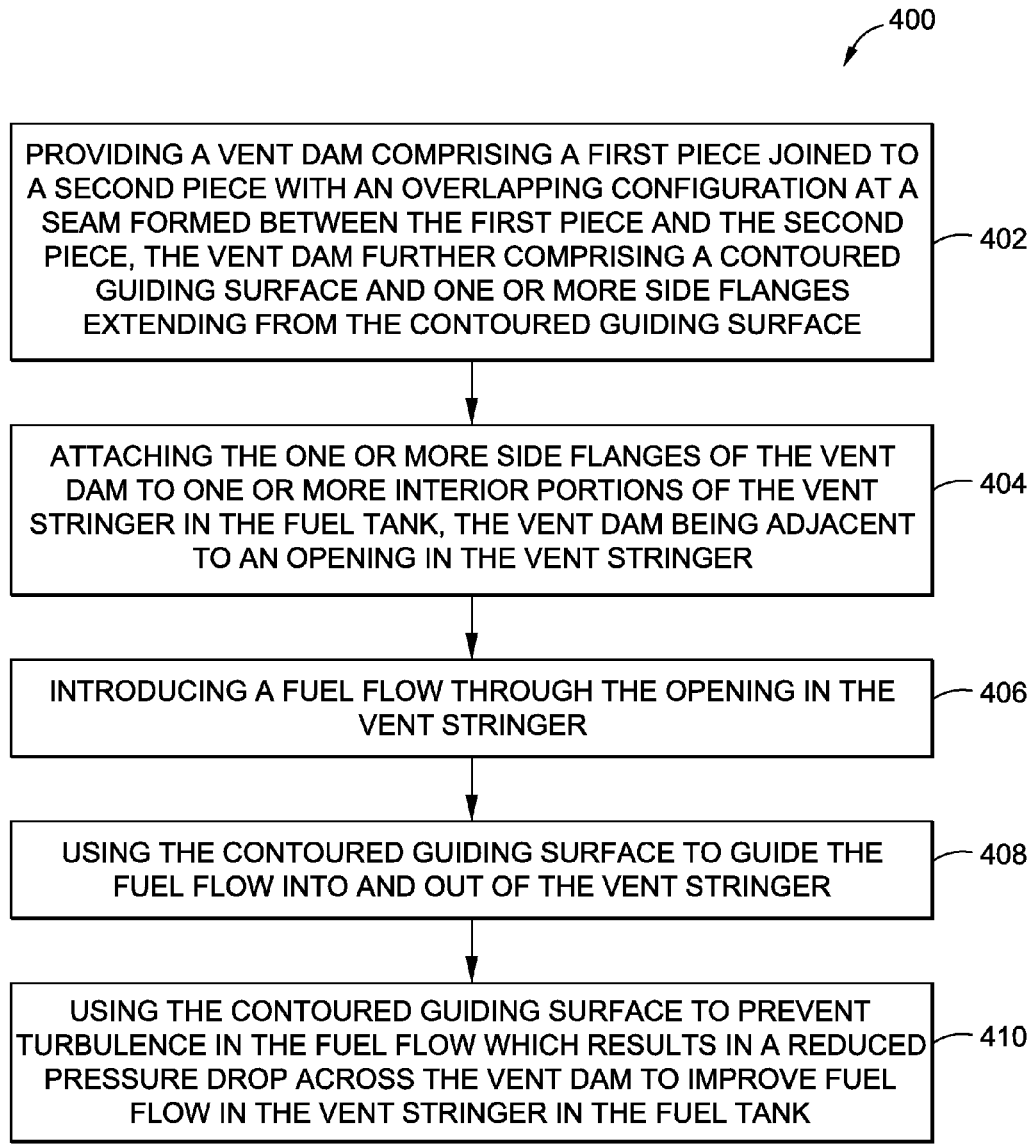

FIG. 25 is an illustration of a flow diagram of another embodiment of a method 400 of the disclosure for providing improved fuel flow 108 in a vent stringer 28 in a fuel tank 46 (see FIG. 15). The method 400 comprises step 402 of providing a vent dam 20, which for example, may preferably comprise a two piece vent dam 20A (FIG. 13A), 20B (FIG. 14A), 20D (FIG. 18A), 20E (FIG. 19A), 20F (FIG. 20A), or 20G (FIG. 21A). As shown in FIG. 15, the vent dam 20 comprises a first piece 100 joined to a second piece 102 with an overlapping configuration 104 at a seam 106 formed between the first piece 100 and the second piece 102. The vent dam 20 further comprises a contoured guiding surface 48 and one or more side flanges 50 extending from the contoured guiding surface 48. Preferably, the vent dam 20 is a fuel vent dam 172 (see FIG. 15). In one of the embodiments as shown in FIG. 15, the contoured guiding surface 48 may be in the form of the curved guiding surface 78 and have a bend radius 79. In another of the embodiments as shown in FIG. 11, the contoured guiding surface 48 may be in the form of a sloped guiding surface 82 sloped at an angle 84 in a range of from about 30 degrees to about 60 degrees.

The method 400 further comprises step 404 of attaching the one or more side flanges 50 of the vent dam 20 to one or more interior portions 139 of the vent stringer 28 in the fuel tank 46. Preferably, the vent dam 20, in the form of the fuel vent dam 172, is installed adjacent to or relative to the opening 32, in the form of access opening 33, in the vent stringer 28. In an exemplary embodiment as shown in FIG. 15, the vent dam 20B is installed within the vent stringer 28. The one or more side flanges 50 of the vent dam 20B are preferably attached to one or more interior portions 139 of the vent stringer 28 of the fuel tank 46. In one of the embodiments, the one or more side flanges 50 may be mechanically attached to the vent stringer 28 via one or more fastener elements 94 (see FIG. 13H). In another one of the embodiments, the one or more side flanges 50 may be bonded to the vent stringer 28 with a bonding agent 98 (see FIGS. 22-23). The vent dam 20B is preferably installed adjacent to or relative to the opening 32, in the form of access opening 33, in the vent stringer 28. In one of the embodiments, the opening 32 that the vent dam 20 may be inserted through may comprise an access opening 33 in the cap portion 30 (see FIG. 14E) where the vent dam 20 is preferably positioned relative to or adjacent to the access opening 33 of the vent stringer 28. In another one of the embodiments, the opening 32 that the vent dam 20 may be inserted through may comprise a base opening 35 between the first web wall 40 and the second web wall 42 (see FIG. 16F).

The method 400 further comprises step 406 of introducing a fuel flow 108 (see FIG. 15) through the opening 32 in the vent stringer 28. FIG. 15 shows fuel flow 108 (as indicated with arrows) entering from tube 72 attached to the vent stringer 28 and entering through the opening 32 into an interior 143 of the vent stringer 28.

The method 400 further comprises step 408 of using the contoured guiding surface 48 to guide the fuel flow 108 into and out of the vent stringer 28. As shown in FIG. 15, the contoured guiding surface 48 of the vent dam 20 guides the fuel flow 108 that enters or is introduced through the opening 32 and directs the fuel flow 108 down the vent stringer channel 144. The contoured guiding surface 48 guides the fuel flow 108 into and out of the vent stringer 28. The contoured guiding surface 48 is designed to smoothly expand or funnel the fuel flow 108 past the vent dam 20 and preferably away from the opening 32. Alternatively, the contoured guiding surface 48 may guide the fuel flow 108 towards the opening 32.

The method 400 further comprises step 410 of using the contoured guiding surface 48 to prevent turbulence (not shown) in the fuel flow 108 which results in a reduced pressure drop 77 (see FIG. 15 (↓P)) across the vent dam 20 to improve fuel flow in the vent stringer 28 in the fuel tank 46. Improved fuel flow may include increased speed of the fuel flow through the fuel tank and fuel vent system and increased efficiency of the fuel flow through the fuel tank and fuel vent system. The bend radius 79 (see FIG. 15) on the contoured guiding surface 48, in the form of the curved guiding surface 78, can facilitate the reduced pressure drop 77 and improved fluid flow. Because the resistance coefficient (K) is a function of the bend radius 79 of the vent dam 20, the performance of the vent dam 20 can be optimized by maximizing the bend radius 79 of the contoured guiding surface 48 within the vent stringer channel 144. Preferably, the larger the bend radius 79 of the contoured guiding surface 48, the lower the pressure drop 77 across the vent dam 20. Given that one or more vent dams 20 may be utilized in the fuel tanks 46 throughout the fuel vent system 52 (see FIG. 5), and the reduced pressure drop is additive, increased fuel flow speed and efficiency can be realized.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A vent dam for use in a vent stringer in a fuel vent system, the vent dam configured to mount to and within the vent stringer, the vent dam comprising:

a contoured guiding surface for guiding fuel flow into and out of an interior of the vent stringer, wherein the vent dam, the vent stringer, and a tube attached to the vent stringer are in fluid communication with one or more fuel tanks; and, one or more side flanges extending from the contoured guiding surface for providing attachment of the vent dam to one or more interior portions of the vent stringer, wherein the contoured guiding surface and the one or more side flanges are formed as one piece.

2. The vent dam of claim 1, wherein the contoured guiding surface is curved.

3. The vent dam of claim 1, wherein the contoured guiding surface is sloped at an angle in a range of from about 30 degrees to about 60 degrees.

4. The vent dam of claim 1, wherein the contoured guiding surface is sloped at an angle of about 45 degrees.

5. The vent dam of claim 1, wherein the one or more side flanges are mechanically attached to the vent stringer via one or more fastener elements.

6. The vent dam of claim 1, wherein the one or more side flanges are bonded to the vent stringer via a bonding agent.

7. The vent dam of claim 1, further comprising an end flange having one or more flange holes in which one or more fastener elements are inserted to fasten and secure the end flange of the vent dam to the vent stringer.

8. The vent dam of claim 1, wherein the vent dam is made of a material selected from the group comprising a composite material, a metal material, aluminum, titanium, carbon fiber reinforcement plastic (CFRP), a carbon fiber impregnated fabric, nylon, carbon fiber laminate, and polyaryletheretherketone (PEEK).

9. The vent dam of claim 1, wherein the vent dam is made of a material that is compatible with a material comprising the vent stringer.

10. An aircraft structure comprising:
at least one wing;
at least one vent stringer mounted to the at least one wing, the at least one vent stringer comprising a base portion, first and second web walls extending outwardly from the base portion, a cap portion, and an access opening in the cap portion, the access opening configured for insertion and installation of vent dams;
at least one fuel tank; and,
the vent dams mounted to and within the at least one vent stringer, the vent dams each comprising:
a contoured guiding surface for guiding fuel flow into and out of an interior of the at least one vent stringer, wherein the vent dams, the at least one vent stringer, and a tube attached to the at least one vent stringer are in fluid communication with the at least one fuel tank; and,
one or more side flanges extending from the contoured guiding surface for providing attachment of the vent dams to one or more interior portions of the at least one vent stringer, wherein at least one of the vent dams is formed as one piece.

11. The aircraft structure of claim 10, wherein the contoured guiding surface is curved.

12. The aircraft structure of claim 10, wherein the contoured guiding surface is sloped at an angle in a range of from about 30 degrees to about 60 degrees.

13. The aircraft structure of claim 10, wherein the vent dams each further comprise an end flange having one or more flange holes in which one or more fastener elements is inserted to fasten and secure the end flange of the vent dam to the vent stringer.

14. The aircraft structure of claim 10, wherein the one or more side flanges are mechanically attached to the vent stringer via one or more fastener elements.

15. The aircraft structure of claim 10, wherein the one or more side flanges are bonded to the vent stringer via a bonding agent.

16. A method for providing improved fluid flow in a vent stringer of a fuel vent system, the method comprising:
attaching one or more side flanges of a vent dam to one or more interior portions of the vent stringer in a fuel tank, the vent dam being adjacent to an opening in the vent stringer, wherein the vent dam includes a contoured guiding surface and the one or more side flanges extending from the contoured guiding surface, and wherein the contoured guiding surface and the one or more side flanges are formed as one piece.

17. The method of claim 16, further comprising:
introducing a fluid flow through the opening in the vent stringer;
using the contoured guiding surface to guide the fluid flow into and out of the vent stringer, wherein the vent dam, the vent stringer, and a tube attached to the vent stringer are in fluid communication with the fuel tank; and,
using the contoured guiding surface to prevent turbulence in the fluid flow which results in a reduced pressure drop across the vent dam to improve fluid flow in the vent stringer of the fuel vent system.

18. The method of claim 16, wherein the attaching the one or more side flanges of the vent dam comprises attaching the vent dam with the contoured guiding surface being curved and having a bend radius.

19. The method of claim 16, wherein the attaching the one or more side flanges of the vent dam comprises inserting one or more fastener elements through one or more flange holes defined through an end flange of the vent dam to fasten and secure the end flange of the vent dam to the vent stringer in the fuel tank.

20. The method of claim 16, wherein the attaching the one or more side flanges of the vent dam comprises mechanically attaching the one or more side flanges to the vent stringer via one or more fastener elements.

21. The method of claim 16, wherein the attaching the one or more side flanges of the vent dam comprises bonding the one or more side flanges to the vent stringer via a bonding agent.

* * * * *